US012155236B2

(12) United States Patent
Yahagi et al.

(10) Patent No.: US 12,155,236 B2
(45) Date of Patent: Nov. 26, 2024

(54) PORTABLE TERMINAL APPARATUS AND WIRELESS POWER TRANSMISSION METHOD BY PORTABLE TERMINAL APPARATUS

(71) Applicant: MAXELL, LTD., Kyoto (JP)

(72) Inventors: Yasuo Yahagi, Tokyo (JP); Takatoshi Shirosugi, Tokyo (JP); Hitoshi Akiyama, Kyoto (JP)

(73) Assignee: MAXELL, LTD., Kyoto (JP)

( * ) Notice: Subject to any disclaimer, the term of this patent is extended or adjusted under 35 U.S.C. 154(b) by 517 days.

(21) Appl. No.: 17/421,182

(22) PCT Filed: Jan. 9, 2019

(86) PCT No.: PCT/JP2019/000405
§ 371 (c)(1),
(2) Date: Jul. 7, 2021

(87) PCT Pub. No.: WO2020/144779
PCT Pub. Date: Jul. 16, 2020

(65) Prior Publication Data
US 2022/0060061 A1 Feb. 24, 2022

(51) Int. Cl.
*H02J 7/00* (2006.01)
*H02J 50/20* (2016.01)
(Continued)

(52) U.S. Cl.
CPC ........ *H02J 50/80* (2016.02); *H02J 7/007182* (2020.01); *H02J 50/20* (2016.02); *H02J 50/40* (2016.02); *H02J 2310/22* (2020.01)

(58) Field of Classification Search
CPC ............. H02J 50/80; H02J 50/40; H02J 50/20
See application file for complete search history.

(56) References Cited

U.S. PATENT DOCUMENTS

| 2010/0315045 | A1 | 12/2010 | Zeine |
| 2013/0026981 | A1* | 1/2013 | Van Der Lee .......... H02J 50/10 320/108 |
| 2016/0197488 | A1 | 7/2016 | Hada et al. |

FOREIGN PATENT DOCUMENTS

| JP | 2010-104103 A | 5/2010 |
| JP | 2010-237931 A | 10/2010 |

(Continued)

OTHER PUBLICATIONS

International Search Report of PCT/JP2019/000405 dated Mar. 5, 2019.

*Primary Examiner* — Robert Grant
(74) *Attorney, Agent, or Firm* — Mattingly & Malur, PC

(57) ABSTRACT

A portable device comprising: an inter-device communication transceiver configured to receive, from at least one subordinate portable device that operates in accordance with control performed by the portable device, a power transfer request signal with respect to the subordinate portable device; a power transfer control circuit configured to transfer power to the subordinate portable device; a battery; and a controller configured to control an operation of the inter-device communication transceiver and an operation of the power transfer control circuit. The controller is further configured to: when the inter-device communication transceiver receives the power transfer request signal, detect a battery residual amount; and perform control for causing the power transfer control circuit and the inter-device communication transceiver to output electromagnetic waves for wireless power transfer in accordance with a detection result of the battery residual amount.

10 Claims, 20 Drawing Sheets

(51) Int. Cl.
 *H02J 50/40* (2016.01)
 *H02J 50/80* (2016.01)

(56) References Cited

FOREIGN PATENT DOCUMENTS

| | | |
|---|---|---|
| JP | 2015-061384 A | 3/2015 |
| JP | 2015-204708 A | 11/2015 |
| JP | 2016-512677 A | 4/2016 |
| JP | 2017-139954 A | 8/2017 |
| JP | 2018-137921 A | 8/2018 |
| WO | 2014/121296 A1 | 8/2014 |

* cited by examiner

PB : BATTERY RESIDUAL AMOUNT
Pth : POWER AMOUNT REQUIRED TO OPERATE PORTABLE DEVICE A0

PB : BATTERY RESIDUAL AMOUNT
Pth : POWER AMOUNT REQUIRED TO OPERATE PORTABLE DEVICE A0

| # | COMMUNICATION | | | | | | | FLOW OF POWER | | | | | | |
|---|---|---|---|---|---|---|---|---|---|---|---|---|---|---|
| CASE1 | | | B0 | ⇔ | A0 | | | A0 | ⇒ | B0 | | | | |
| CASE2 | B1 | ⇔ | B0 | ⇔ | A0 | | | A0 | ⇒ | B0 | ⇒ | B1 | | |
| CASE2-1 | B1 | ⇔ | B0 | ⇔ | A0 | | | A0 | ⇒ | B1 | | | | |
| CASE3 | | | B0 | ⇔ | A0 | ⇔ | A1 | A1 | ⇒ | A0 | ⇒ | B0 | | |
| CASE3-1 | | | B0 | ⇔ | A0 | ⇔ | A1 | A1 | ⇒ | | | B0 | | |
| CASE4 | B1 | ⇔ | B0 | ⇔ | A0 | ⇔ | A1 | A1 | ⇒ | A0 | ⇒ | B0 | ⇒ | B1 |
| CASE4-1 | B1 | ⇔ | B0 | ⇔ | A0 | ⇔ | A1 | A1 | ⇒ | | | | ⇒ | B1 |
| CASE4-2 | B1 | ⇔ | B0 | ⇔ | A0 | ⇔ | A1 | A1 | ⇒ | | | B0 | ⇒ | B1 |
| CASE4-3 | B1 | ⇔ | B0 | ⇔ | A0 | ⇔ | A1 | A1 | ⇒ | A0 | ⇒ | | ⇒ | B1 |

PORTABLE TERMINAL APPARATUS AND WIRELESS POWER TRANSMISSION METHOD BY PORTABLE TERMINAL APPARATUS

TECHNICAL FIELD

The present invention relates to a portable device and a wireless power transfer method by the portable device.

BACKGROUND ART

There have been known wireless power transfer techniques for portable devices, for example, Patent Literature 1 discloses a wireless power transfer system for supplying wireless charging and/or main power to an electronic/electric device through microwave energy. Patent Literature 2 discloses systems and methods for optimally delivering pulsed wireless power using a transmitter assembly that is useful in optimizing the delivery of wireless power to a plurality of receivers.

CITATION LIST

Patent Literature

Patent Literature 1: JP-A-2017-139954
Patent Literature 2: JP-A-2016-512677

SUMMARY OF INVENTION

Technical Problem

In Patent Literature 1, its wireless power transfer technique is limited to wireless power transfer from a wireless power transmitter to a portable device. When a portable device that is separated by more than a distance capable of receiving power from the wireless power transmitter needs wireless power transfer, the portable device cannot receive the power. Furthermore, the wireless power transfer from the wireless power transmitter to the portable device according to Patent Literature 1 uses electromagnetic waves of at least one frequency. Accordingly, when many portable devices require power transfer, as disclosed in Patent Literature 2, at least one of a transmission phase, frequency, timing, amplitude, and direction is changed to supply the respective portable devices with power.

However, for example, the number of frequency bands that can be used by one wireless power transmitter is limited. Accordingly, in the case where power transfer to the number of portable devices which exceeds the number above is required, a problem that one or more portable device among them is not supplied with power may occur. Even when trying to solve this problem by increasing the number of devices for exclusive use of wireless transmission, another problem of increase in the cost of the wireless power transmitters may occur. Particularly, in recent years, there have been cases where a single user uses a smartphone and at least one wearable device that operates in accordance with the smartphone. Accordingly, when each portable device makes a power transfer request to one wireless power transmitter, there is a concern that resources such as a frequency band of the wireless power transmitter becomes insufficient.

The present invention has been made in view of the circumstances above, and an object of the present invention is to reduce, as much as possible, a time in which a specific user occupies resources of a wireless power transmitter so as to allow a plurality of users to share the resources during wireless power transfer to a portable device.

Solution to Problem

As one aspect of the present invention, it is provided a portable device comprising: an inter-device communication transceiver configured to receive, from at least one subordinate portable device that operates in accordance with control performed by the portable device, a power transfer request signal with respect to the subordinate portable device; a power transfer control circuit configured to transfer power to the subordinate portable device; a battery; and a controller configured to control an operation of the inter-device communication transceiver and an operation of the power transfer control circuit, the controller being further configured to: when the inter-device communication transceiver receives the power transfer request signal, detect a battery residual amount charged in the battery; and perform control for causing the power transfer control circuit and the inter-device communication transceiver to output electromagnetic waves for wireless power transfer in accordance with a detection result of the battery residual amount.

Advantageous Effects of Invention

According to the present embodiment, it is possible to reduce, as much as possible, a time in which a specific user occupies resources of a wireless power transmitter so as to allow a plurality of users to share the resources during wireless power transfer to a portable device. The objects, configurations, and effects other than those described above will be clarified by explanation of the embodiments below.

DESCRIPTION OF EMBODIMENTS

Hereinafter, embodiments of the present invention will be described with reference to the drawings. Throughout the drawings, the same components and processes are provided with the same reference signs, and repetitive explanation therefor will be omitted. In the following, the embodiments of a portable device and a wireless power transfer method by the portable device according to the present invention will be described.

First Embodiment

Figure 1:
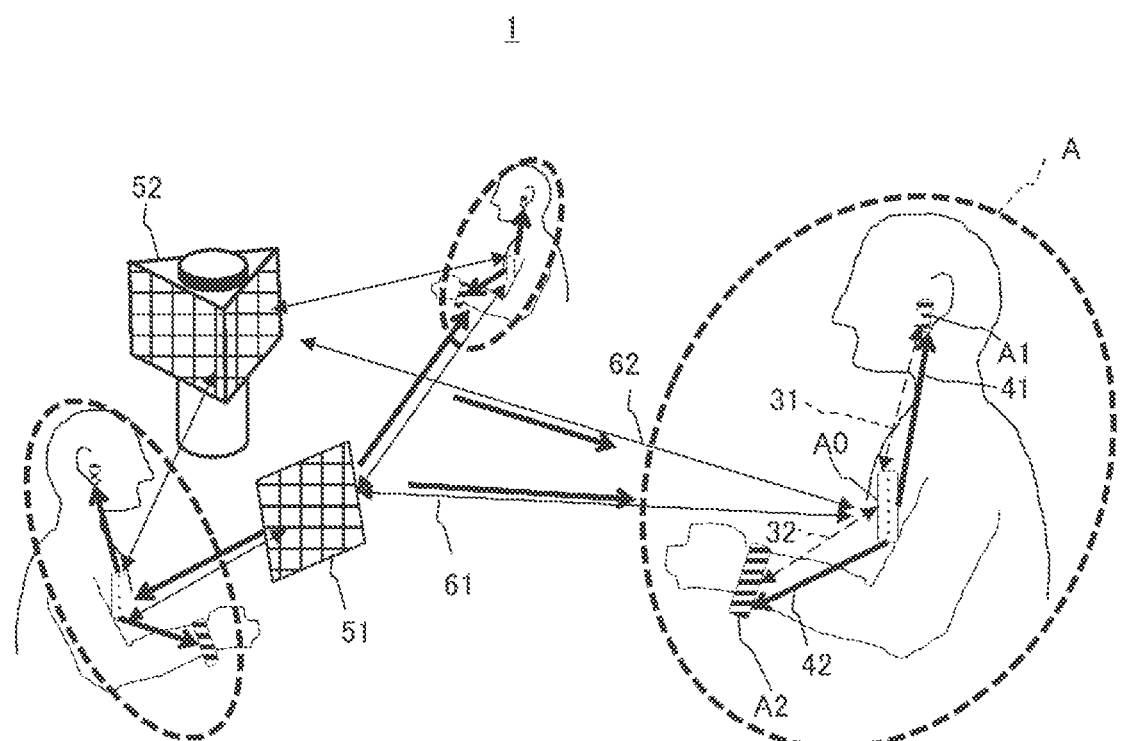
FIG. 1 illustrates an outline of a wireless power transfer system.

FIG. 1 illustrates an outline of a wireless power transfer system 1. The wireless power transfer system 1 includes a main portable device (hereinafter referred to as "A0") and at least one subordinate portable device (hereinafter referred to as "A1, A2") which performs inter-device communication with A0. In the wireless power transfer system 1, A0 and A1, A2 form a group A of the portable devices, and A0 transmits electromagnetic waves (wireless power transfer waves) 41, 42 to A1, A2 to transfer (supply) power to A1, A2.

For example, A0 is a smart phone or a tablet terminal, A1 is a wireless earphone, and A2 is a smart watch. The subordinate portable device may be a wearable device such as a smart glass. Any type of device may be used as the subordinate portable device as long as it operates by receiving a control signal from A0 serving as a master by inter-device communication 31, 32.

As a communication method of the inter-device communication 31, 32, for example, Bluetooth (registered trademark) may be used. Furthermore, whether A0 and A1, A2 are in a group relationship may be determined based on whether pairing between A0 and each of A1 and A2 is found through Bluetooth (registered trademark).

An exclusive wireless power transmitter 51 is capable of supplying power by wireless power transfer. A wireless base station 52 is a base station for a mobile communication system, for example, the fifth-generation mobile communication system (5G). The mobile communication system can supply power by wireless power transfer, which is equivalent to the wireless power transfer by the exclusive wireless power transmitter 51. In addition from the exclusive wireless power transmitter 51, A0 receives electromagnetic waves 61, 62 from at least one power transfer device, such as the wireless base station 52 so as to be supplied with power. Alternatively, A0 may be charged by receiving power from an AC adapter 115 (see FIG. 2).

In the group A, A0 performs control within the group A. The group A has a star structure in which A1 and A2 communicate with each other through A0.

Figure 2:
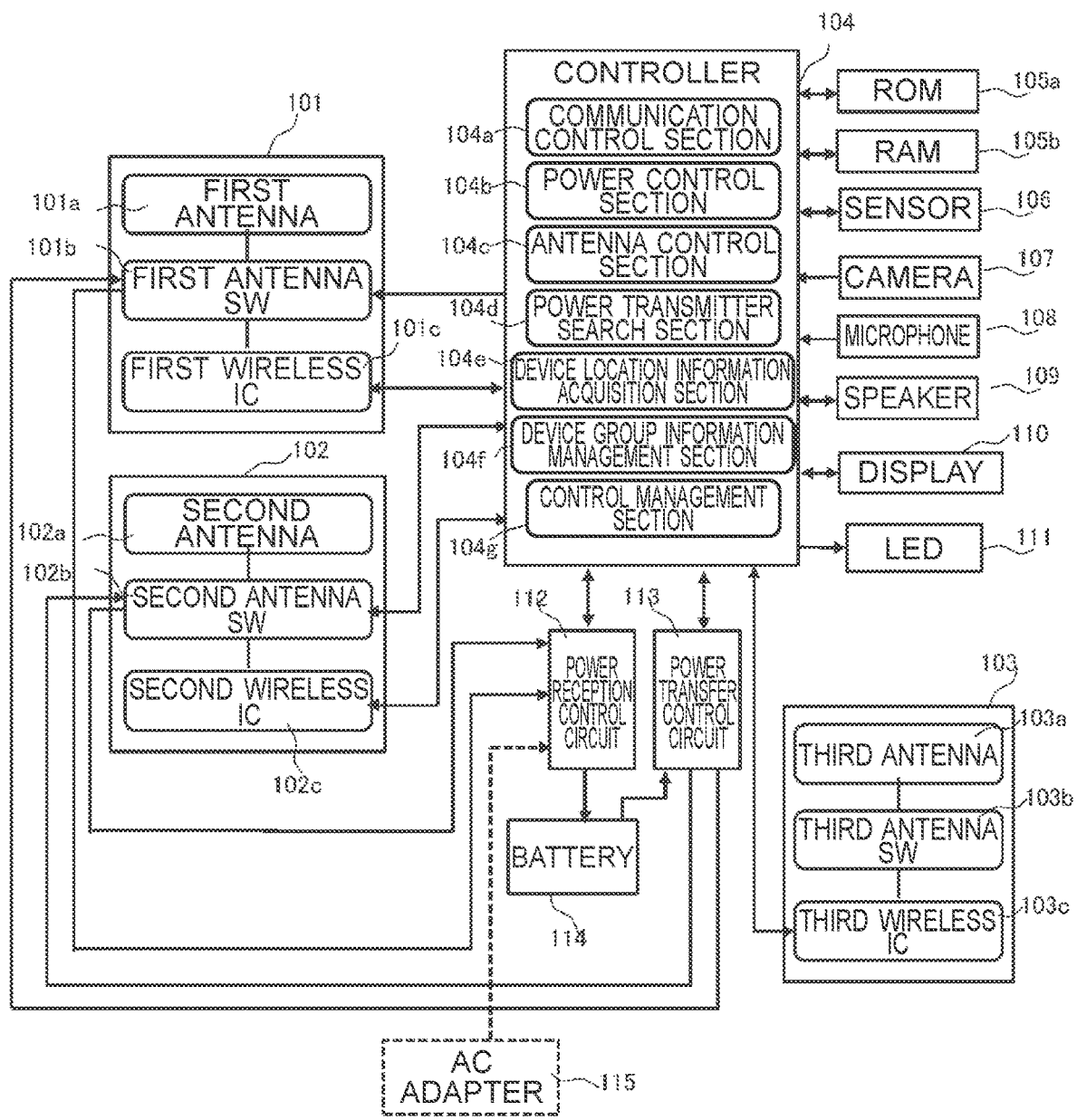
FIG. 2 is a functional block diagram of a main portable device (A0).

FIG. 2 is a functional block diagram of A0. A0 includes a first communication unit 101, a second communication unit 102, and a third communication unit 103 which is an inter-device communication transceiver. A0 further includes a ROM 105a, a RAM 105b, a sensor 106, a camera 107, a microphone 108, a speaker 109, a display 110, an LED 111, a power reception control circuit 112, and a power transfer control circuit 113, each of which is connected to a controller 104.

Each of the first communication unit 101, the second communication unit 102, and the third communication unit 103 includes, a first antenna 101a, a second antenna 102a, and a third antenna 103a, respectively, a first antenna switch (SW) 101b, a second antenna SW 102b, and a third antenna SW 103b, respectively, and a first wireless IC 101c, a second wireless IC 102c, and a third wireless IC 103c, respectively.

The first communication unit 101 is used for wireless communication in a millimeter wave band. The second communication unit 102 is used for wireless communication in a microwave band. The third communication unit 103 is used for wireless communication in the microwave band or wireless communication in the millimeter wave band. Among the various types of wireless communication, the first communication unit 101 and the second communication unit 102 perform wireless communication with a base station of a mobile communication system such as the fifth-generation mobile communication system (5G). Therefore, the exclusive wireless power transmitter 51 corresponds to a mobile communication system communication transceiver. Furthermore, the first communication unit 101 and the second communication unit 102 receive or transfer power by using electromagnetic waves when each of the antenna switches therein is switched. Therefore, the first communication unit 101 and the second communication unit 102 correspond to an external communication transceiver for receiving electromagnetic waves (wireless power transfer waves). Among the various types of wireless communication, the third communication unit 103 performs wireless communication such as Wi-Fi (registered trademark), WiGig (registered trademark), or Bluetooth (registered trademark), and a plurality of the third communication units 103 may be provided. Therefore, the third communication unit 103 functions as a wireless communication transceiver.

Three sets of hardware for the first communication unit 101, the second communication unit 102, and the third communication unit 103 may be used. Otherwise, a set of hardware may be shared by the second communication unit 102 and the third communication unit 103 by changing the control logics therein for their operations. In this case, A0 includes two sets of hardware for the two communication units of the first communication unit 101 and the second communication unit 102 while using a plurality of control logics for the three communication units for their operations.

A0 further includes a battery 114. The power reception control circuit 112 charges the battery 114. Furthermore, the power reception control circuit 112 receives power from the AC adapter 115 via a commercial power source.

The power transfer control circuit 113 extracts power from the battery 114 and transmits electromagnetic waves (radio waves) through the first communication unit 101 or the second communication unit 102 to supply A1 with the power.

The controller 104 is configured by using, for example, a Central Processing Unit (CPU), and to load a control program stored in the ROM 105a onto the RAM 105b to execute the program, thereby realizing the following functional elements.

The controller 104 includes a communication control section 104a, a power control section 104b, an antenna control section 104c, a wireless power transmitter search section 104d, a device location information acquisition section 104e, a device group information management section 104f, and a control management section 104g. The communication control section 104a is configured to control communication with other mobile devices. The power control section 104b is configured to control power of A0. The antenna control section 104c is configured to control the first antenna SW 101b, the second antenna SW 102b, and the third antenna SW 103b based on information such as communication frequency by the communication control section 104a. The wireless power transmitter search section 104d is configured to search for the exclusive wireless power transmitter 51 or a mobile device having a power transfer function existing therearound. The device location information acquisition section 104e is configured to acquire location information of the exclusive wireless power transmitter 51 or the mobile device having the power supply function existing therearound and transmit the acquired location information to other portable devices. The device group information management section 104f is configured to manage device information such as battery capacities and functions of the wireless devices in the group A to which A0 itself belongs, as well as information at different times such as residual power amounts, location, use frequency, and other similar information relating to a wireless device which performs communication outside the group. The control management section 104g is configured to perform overall control of the main portable device A0.

Figure 3:
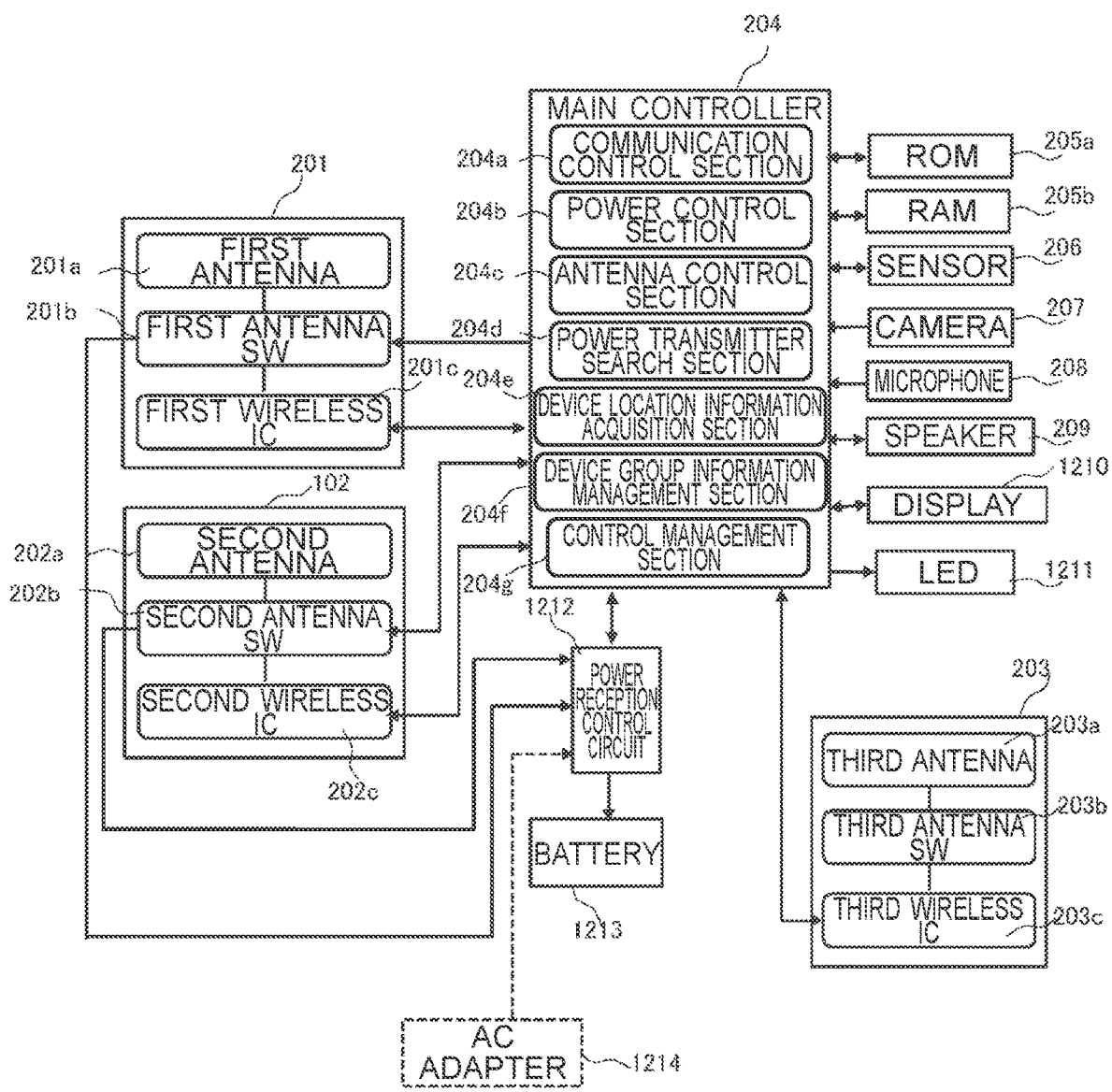
FIG. 3 is a schematic configuration diagram of a subordinate portable device (A1).

FIG. 3 is a schematic configuration diagram of A1. A1 is a portable device which includes a power reception function but does not include a power transfer function. In this connection, in the second embodiment and thereafter which will be described later, A1 includes the power transfer function.

The basic configuration of A1 is the same as that of A0, but differs in that A1 does not include the power transfer control circuit 113. Accordingly, A1 only receives power from the exclusive wireless power transmitter 51 or A0 existing therearound, but cannot transfer power to A0.

Figure 4:
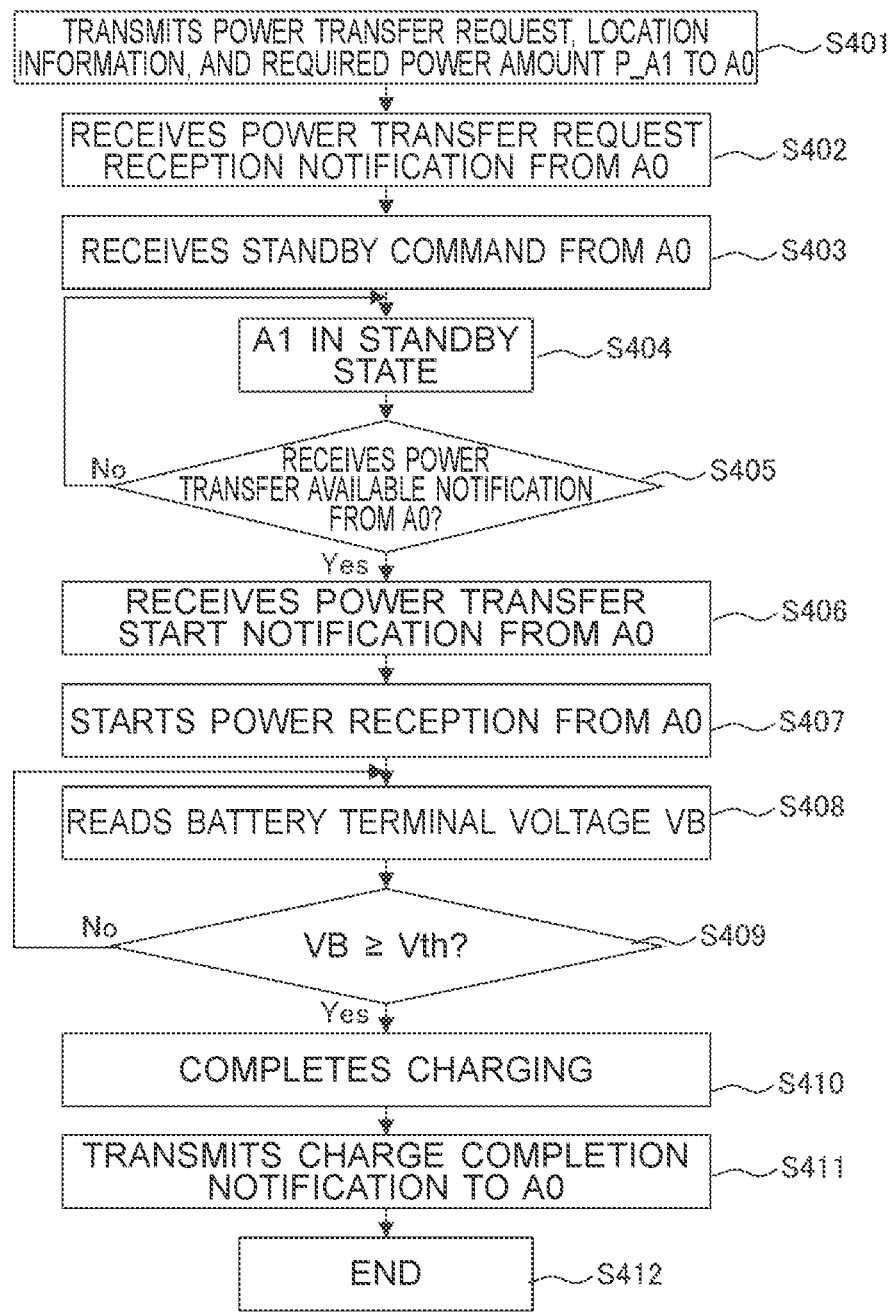
FIG. 4 illustrates a flowchart of processing in A1 from a power transfer request process to a charging process.
Figure 5:
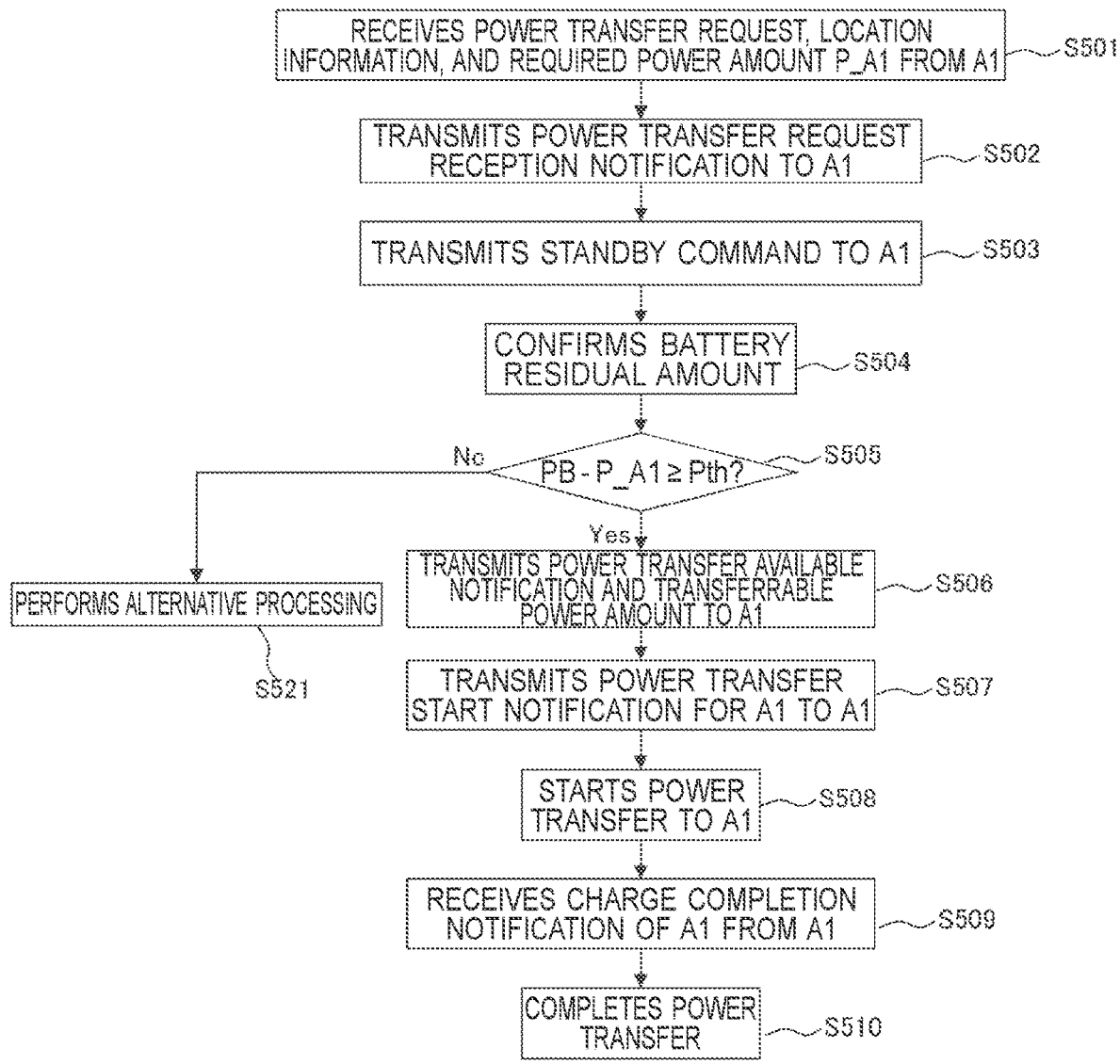
FIG. 5 illustrates a flowchart of processing in A0 from a power transfer request process to a power transfer process.
Figure 6:
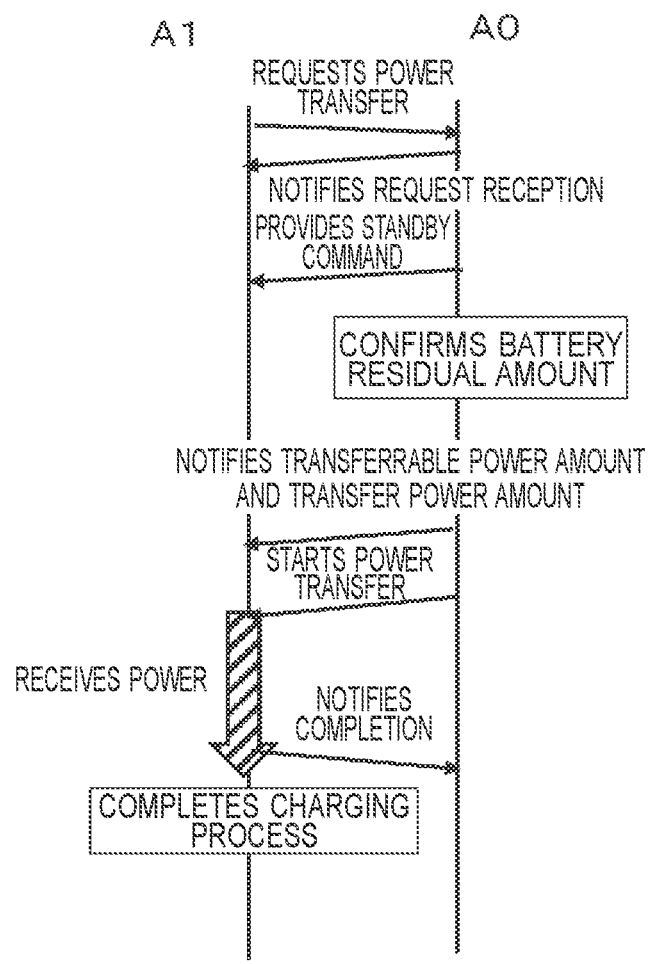
FIG. 6 illustrates a sequence of processing from power transfer request to charging process from A1 to A0.

With reference to FIG. 4 to FIG. 6, power transfer processing from A0 to A1 forming the group A when power of A1 is insufficient will be described. FIG. 4 illustrates a flowchart of processing in A1 from a power transfer request process to a charging process. FIG. 5 illustrates a flowchart of processing in A0 from the power transfer request process to a power transfer process. FIG. 6 illustrates a sequence of the processing from power transfer request to charging process from A1 to A0.

Based on a device group information management section 204f of a controller 204, A1 transmits, to A0 that performs control within the group A, a power transfer request notification, location information of A1, and information of a required power amount P_A1 (step S401), and A0 receives them (step S501).

The device group information management section 104f of A0 stores the location information of A1 and information of the required power amount P_A1 in the RAM 106b.

Next, A0 transmits a reception notification of the power transfer request notification to A1 (step S502), and A1 receives the notification (step S402).

Then, A0 transmits a standby command to A1 (step S503), and A1 receives the command (step S403) and is shifted into a standby state (step S404).

The power control section 104b of A0 confirms a residual battery amount PB (step S504) to determine whether wireless power transfer of the required power amount P_A1 that has been previously requested from A1 can be performed. In the first embodiment, the determination above is made based on whether a difference between PB and P_A1 is greater than an amount of power required to operate A0 (power transfer lower allowable limit value) Pth (step S505).

The power transfer lower allowable limit value Pth may be an operation guarantee power amount of A0, or may be a value greater than the operation guarantee power amount.

When the power residual amount PB-P_A1 of A0 after transferring power to A1 is higher than the power transfer lower allowable limit value Pth (step S505/Yes), the power control section 104b determines that the wireless power transfer to A1 can be performed. Then, the power control section 104b transmits a power transfer available notification to A1 (step S506), and A1 receives the notification (step S405/Yes).

Next, A0 transmits a power transfer start notification to A1 (step S507), and A1 receives the notification (step S406).

A0 starts transferring power (step S508), and A1 receives the power (step S407).

A power control section 204b of A1 periodically reads a battery terminal voltage VB during power transfer (step S408) to determine whether the battery terminal voltage VB exceeds a required voltage value (charge determination threshold) Vth (step S409). After the battery terminal voltage VB exceeds the charge determination threshold Vth (step S409/Yes), the power control section 204b determines that charging is completed (step S410), and transmits a charge completion notification to A0 (step S411).

When A0 receives the charge completion notification from A1 (step S509), A0 terminates the power transfer to A1 (step S510) and completes the charging process (step S412).

In step S505, when the power residual amount PB-P_A1 of A0 after transferring power to A1 is equal to or less than the power transfer lower allowable limit value Pth (step S505/No), the processing of transferring the total amount of the requested power from A1 cannot be performed. In this case, alternative processing including processing of transferring a transferrable amount of power or processing of searching for a wireless power transmitter (step S521), which will be described below, is executed.

Processing of Transferring Transferrable Amount of Power

In the processing illustrated in FIG. 4 to FIG. 6, at the stage when A1 finishes receiving the amount of power that can be transmitted from A0 which is a transmission source, A1 transmits a completion notification to A0 which is the transmission source.

On the other hand, the residual amount of the battery 114 of A0 does not always satisfy the required power from A1. In such a case, as the alternative processing, only a transferrable amount of power may be transferred to A1.

Figure 7:
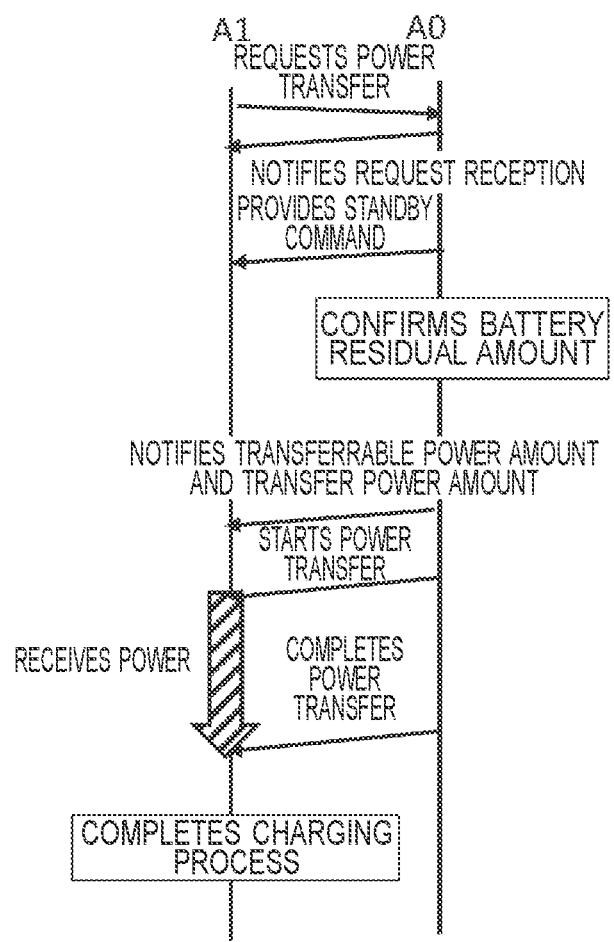
FIG. 7 illustrates a sequence of transferring a transferrable amount of power.

FIG. 7 illustrates a sequence of transferring a transferrable amount of power. As illustrated in FIG. 7, even when the total amount of power requested by A1 cannot be transferred, A0 may calculate the transferrable amount of power and then complete the charging process upon completion of the power transfer to A1. In this case, when the determination result in step S505 of FIG. 5 is negative, A0 as the transmission source calculates the transferrable amount of power by, for example, computing a value of (battery residual amount PB—required power amount P_A1 by A1) by means of the power control section 104b. When the value of (battery residual amount PB—required power amount P_A1 by A1) exceeds the power supply allowable lower limit value Pth, the power control section 104b notifies A1 of the transferrable amount of power in step S506, and transmits the power transfer start notification (step S507). The controller 104 outputs a power transfer instruction signal to the power transfer control circuit 113 to start transferring power (step S508). In the first embodiment, the power transfer lower allowable limit value Pth is an amount of power required to operate the device A0.

The power control section 104b transmits the power transfer completion notification to A1 upon completion of power transfer of the transferrable amount of power. Thereafter, A0 completes the charging process.

Processing of Searching for Wireless Power Transmitter

In the process in which A0 determines whether wireless power transfer to A1 can be performed (step S505), when the value of PB-P_A1 is less than the power transfer lower allowable limit value Pth, A0 may search for another wireless power transmitter while keeping A1 in the standby state (step S521).

Figure 8:
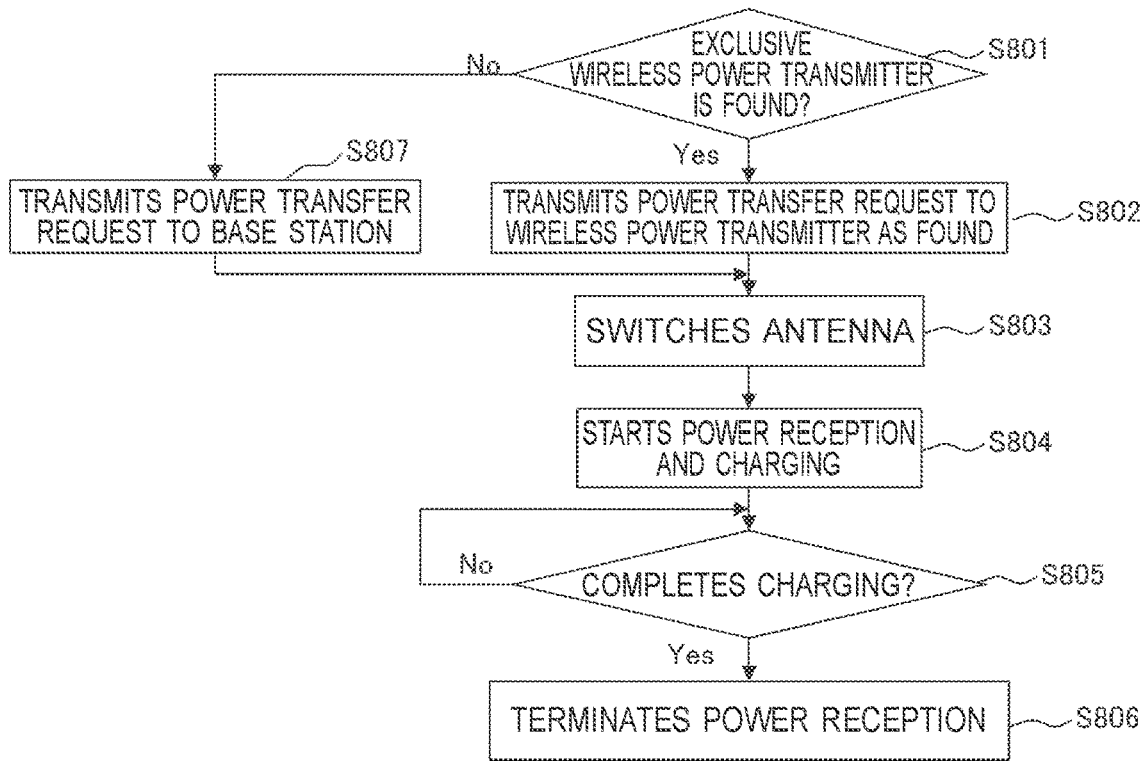
FIG. 8 illustrates a flowchart of wireless power transmitter search processing executed by A0.

FIG. 8 illustrates a flowchart of wireless power transmitter search processing executed by A0.

The wireless power transmitter search section 104d of A0 searches for a wireless power transmitter (exclusive wireless power transmitter) that can be paired (step S801). For example, the search for a wireless power transmitter is performed by wireless communication by causing the communication control section 104a to activate an ad hoc mode of Wi-Fi (registered trademark) of the third communication unit 103. Alternatively, the search may be performed through a mobile communication system such as the 5G system by causing the communication control section 104a to activate the first communication unit 101 or the second communication unit 102. When the wireless power transmitter search section 104d can find a wireless power transmitter (step S801/Yes), it transmits a power transfer request to the wireless power transmitter as found (step S802).

When the wireless power transmitter search section 104d fails to find a wireless power transmitter (step S801/No), it transmits a power transfer request to the wireless base station (step S807).

The antenna control section 104c confirms the frequency used in wireless power transfer with the wireless base station or the wireless power transmitter, selects the first communication unit 101 or the second communication unit 102, and sets the first antenna switch 101b or the second antenna switch 102b as selected to the power reception control circuit side (step S803).

Upon completion of pairing with the wireless base station or the wireless power transmitter, the power control section 104b receives electromagnetic waves from the first antenna 101a or the second antenna 102a, and the power reception control circuit 112 receives power. The received power is charged in the battery 114 (step S804).

The power control section 104b monitors the residual amount of the battery 114. When determining that charging is completed (step S805/Yes), the power control section 104b transmits a charge completion notification to the wireless base station or the wireless power transmitter, and terminates the power reception (step S806). The power reception continues until completion of charging (step S805/No).

Since it is assumed that power reception via a mobile communication system such as the 5G system is subject to billing, the following processing may be performed to minimize the billing. That is, power reception is started only when the battery residual amount is equal to or less than a predetermined power reception start threshold, and it is stopped when the battery residual amount reaches a power reception stop threshold.

The power reception start threshold may be a value equal to or greater than the power transfer lower allowable limit value Pth, but should be a value smaller than the power reception stop threshold. The power reception stop threshold may be a value smaller than a charging capacity of the battery 114, in other words, a value smaller than the fully charged value, for example, 80% of the maximum storage amount. This processing makes it possible to reduce, as much as possible, the power transfer through the 5G system which may be subject to billing.

On the other hand, since the power transfer through a wireless power transmitter is not subject to billing when, for example, the wireless power transmitter is at home, the power reception start threshold and the power reception stop threshold are not necessarily provided.

According to the first embodiment, when A1 needs power transfer, it transmits a power transfer request to A0 to receive power from A0. Since A0 and A1 perform inter-device communication, communication with a wireless power transmitter is not required when A1 receives the power. As a result, the frequency band to be used in power transfer from the wireless power transmitter is not occupied.

For example, in the case where a single user owns a plurality of wearable devices such as a smartphone, wireless earphone, and smartwatch, when each device individually communicates with a 5G base station (corresponding to a mobile wireless base station) or a wireless power transmitter, a plurality of frequency bands is required for each device. With this regard, according to the first embodiment, since the portable devices owned by the single user form a group within which the wireless power transfer can be performed, thereby suppressing occupation of a plurality of finite frequency bands by the single user and facilitating wireless power transfer from the wireless power transmitter or the 5G base station to a plurality of users.

In the first embodiment, A0 executes the wireless power transmitter search processing as a part of the processing of responding the power transfer request from the A0. Meanwhile, A0 may execute the wireless power transmitter search processing in accordance with the residual amount of the battery 114 of A0, regardless of the presence or absence of the power transfer request.

For example, it may be configured that the power control section 104b monitors the residual amount of the battery 114 of A0, and when detecting that the battery residual amount becomes equal to or less than the threshold for determining start of power reception (power reception start threshold), it executes the wireless power transmitter search processing.

As a result, for example at visiting places, the main portable device A0 is not fully charged but supplied with a necessary and sufficient amount of power while being fully charged at home.

Second Embodiment

A second embodiment is configured to, when the battery residual amount of A0 cannot satisfy the required power of A1, transfer power to A1 by using a residual battery amount of another A0 forming the group A.

Figure 9A:
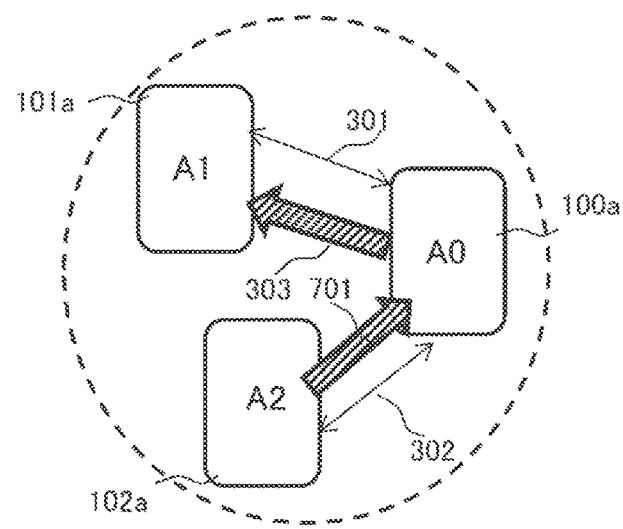
FIG. 9A illustrates a power transfer mode in a second embodiment.
Figure 9B:
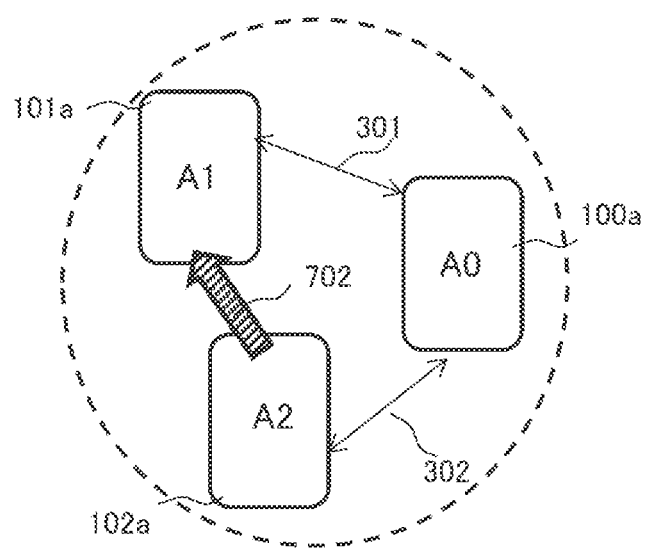
FIG. 9B illustrates a power transfer mode in the second embodiment.
Figure 10:
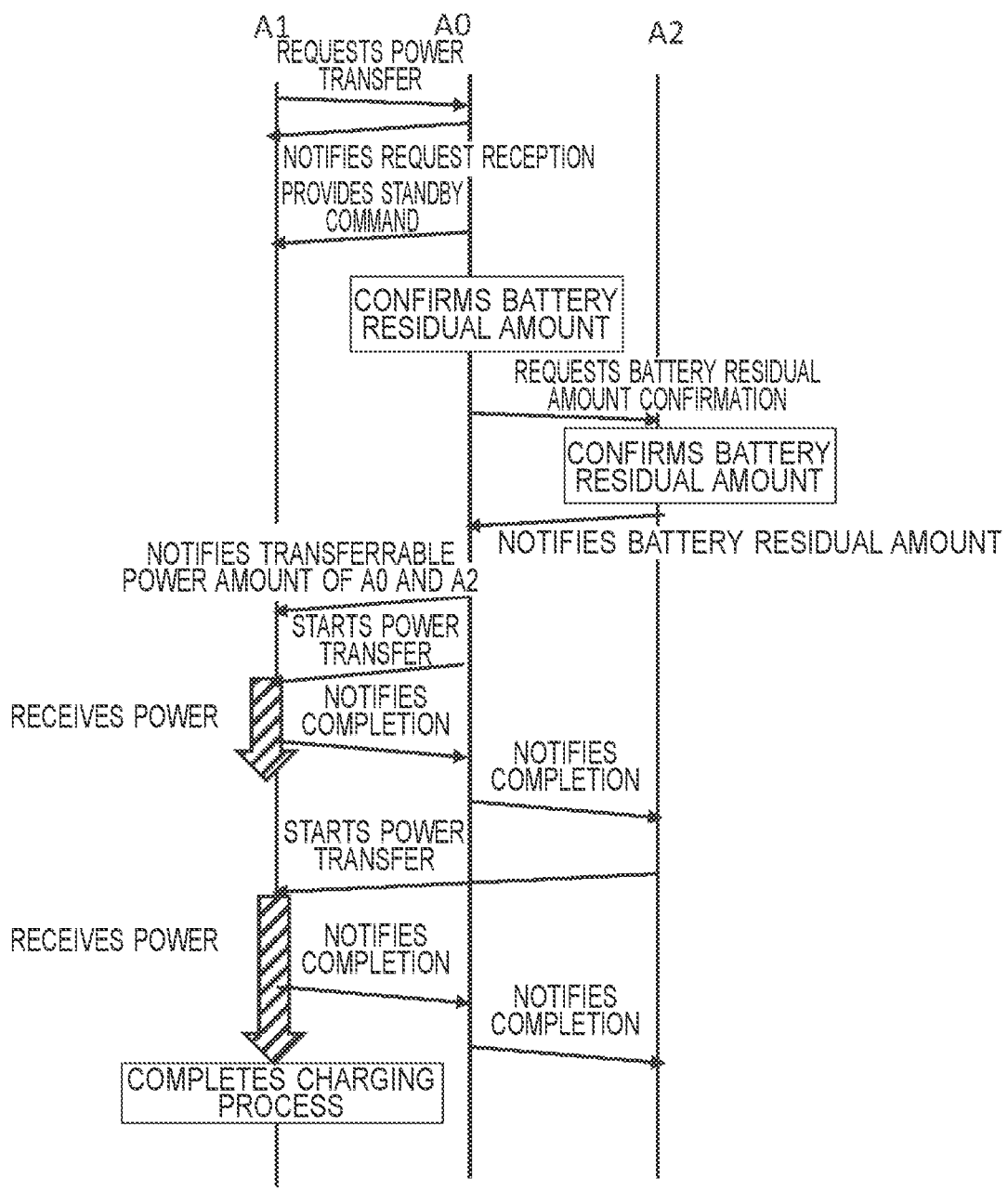
FIG. 10 illustrates a sequence of processing of power transfer request and charging in the second embodiment.
Figure 11:
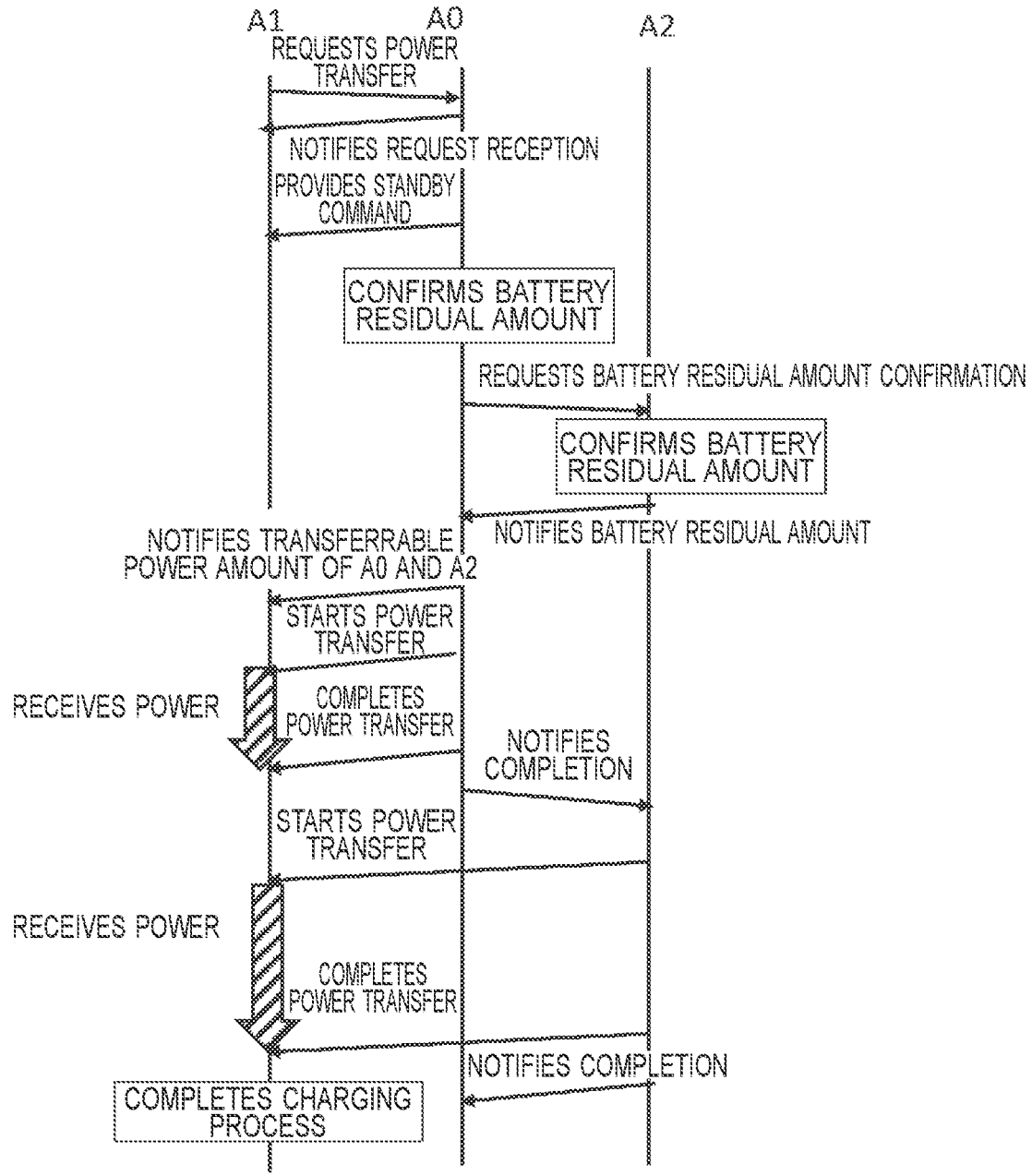
FIG. 11 illustrates a sequence of processing of power transfer request and charging in the second embodiment.

FIG. 9A and FIG. 9B illustrate a power transfer mode in the second embodiment. FIG. 10 and FIG. 11 illustrate a sequence of processing of power transfer request and charging in the second embodiment.

FIG. 9A illustrates a mode in which A2 wirelessly transfers power to A0, then A0 determines whether power transfer from A0 to A1 can be performed (step S505, step S506), and thereafter, A0 transfers the power to A1.

Alternatively, as illustrated in FIG. 9B, A0 may transmit, to A2, the location information of A1 stored in a memory of the device group information management section 104f of A0 so that A2 directly transfers power to A1.

Furthermore, as illustrated in FIG. 10, A1 may receive, from the portable device A2, an amount of power which has not been satisfied by the power transfer from A0.

In this case, when the value of PB-P_A1 is less than Pth in step S505, A0 transmits, to the portable device A2 in the group A, a battery residual amount confirmation request, the location information of A1, and information of an insufficient amount of power supplied from A0 to A1.

Upon receiving them, A2 causes the power control section 204b to confirm the battery residual amount of A2 and notifies A0 with the amount as confirmed.

The power control section 104b of A0 calculates an amount of power that can be transmitted to A1 from A0 and an amount of power that can be transmitted to A1 from A2, respectively, based on the battery residual amount of A2 received from A2. Then, A0 notifies A1 with the amount of power to be transmitted from A2.

Thereafter, A0 starts transferring power to A1, receives, from A1, a power transfer completion notification of the required amount of power, and then transmits, to A2, the power transfer completion notification received from A1. Upon receiving, from A0, the power transfer completion notification from A0 to A1, A2 starts transferring power to A1.

When receiving a certain amount of power, A1 transmits a power reception completion notification to A0. Upon receiving the power reception completion notification from A1, A0 transmits a completion notification to A2. When receiving the completion notification, A2 terminates power transfer to A1, and then completes the power transfer to A1.

In the processing above, when receiving power from A0, A1 transmits the completion notification to A0, and when receiving power from A2, A1 transmits the completion notification to A2. That is, A1 transmits the completion notification to each power transfer source at each stage where A1 receives each amount of power that can be transmitted.

In FIG. 10, A1 transmits the power reception completion notification to A0 and A0 transmits the power transfer completion notification to A2. Meanwhile, as illustrated in FIG. 11, A0 may notify A1 of completion of power transfer and transmit the power transfer completion notification to A2.

In the processing above, the power transfer to A1 from A2 follows the power transfer to A1 from A0. Meanwhile, the order of power transfer may be reversed. In addition, A0 and A2 may transfer power to A1 at the same time.

The second embodiment is applied to the case where the communication network in the group A has a star structure whose center is A0. Meanwhile, the second embodiment may be also applicable to the cases where the communication network in the group A has a mesh structure, a full-connect structure, and the like.

As described above, according to the second embodiment, a portable device can be supplied with power from not only a wireless power transmitter for exclusive use of wireless transmission but also another portable device. As a result, the load of the exclusive wireless power transmitter is distributed to the portable device capable of transferring power, thereby making it possible to reduce the load of the exclusive wireless power transmitter.

Third Embodiment

Figure 12:
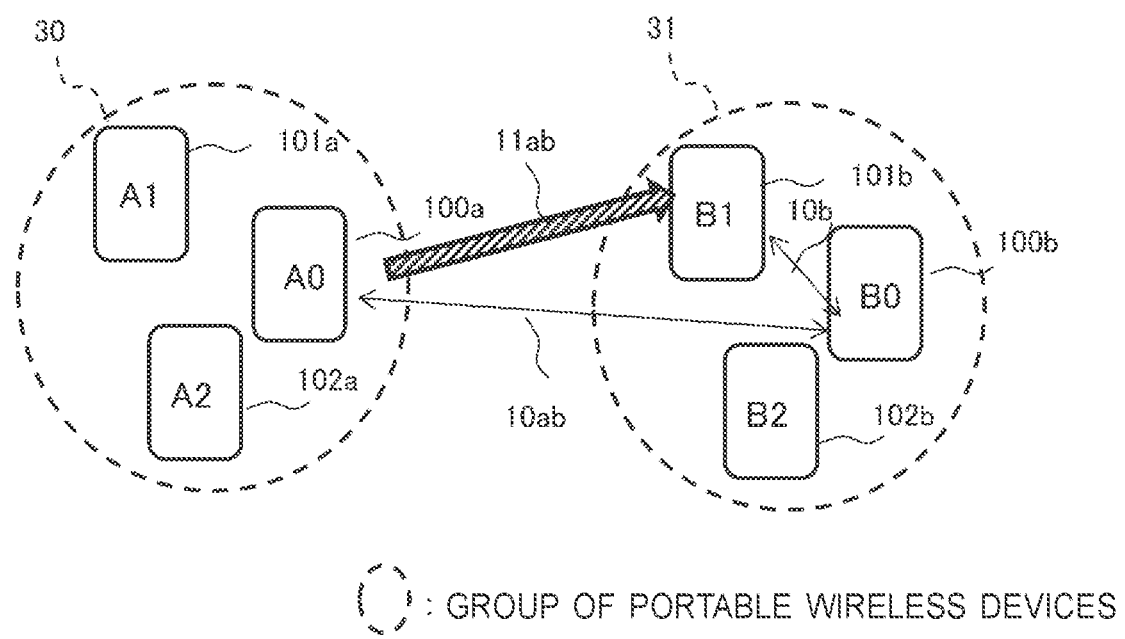
FIG. 12 illustrates a power transfer mode according to a third embodiment.

A third embodiment is configured to transfer power between a plurality of groups of portable devices. FIG. 12 illustrates a power transfer mode according to the third embodiment.

FIG. 12 illustrates, for convenience of explanation, communication and power transfer between two groups, the group A and a group B. The configuration of the group B is the same as that of the group A described above. The communication network in each group A, B has a star structure each of which the center is A0 and B0, respectively.

When a subordinate portable device (hereinafter, referred to as "B1") controlled by a main portable device (hereinafter, referred to as "B0") makes a power transfer request among the portable devices forming the group B, if there is no power margin in the group B, the subordinate portable device has to make the request to the outside of the group B.

Figure 13:
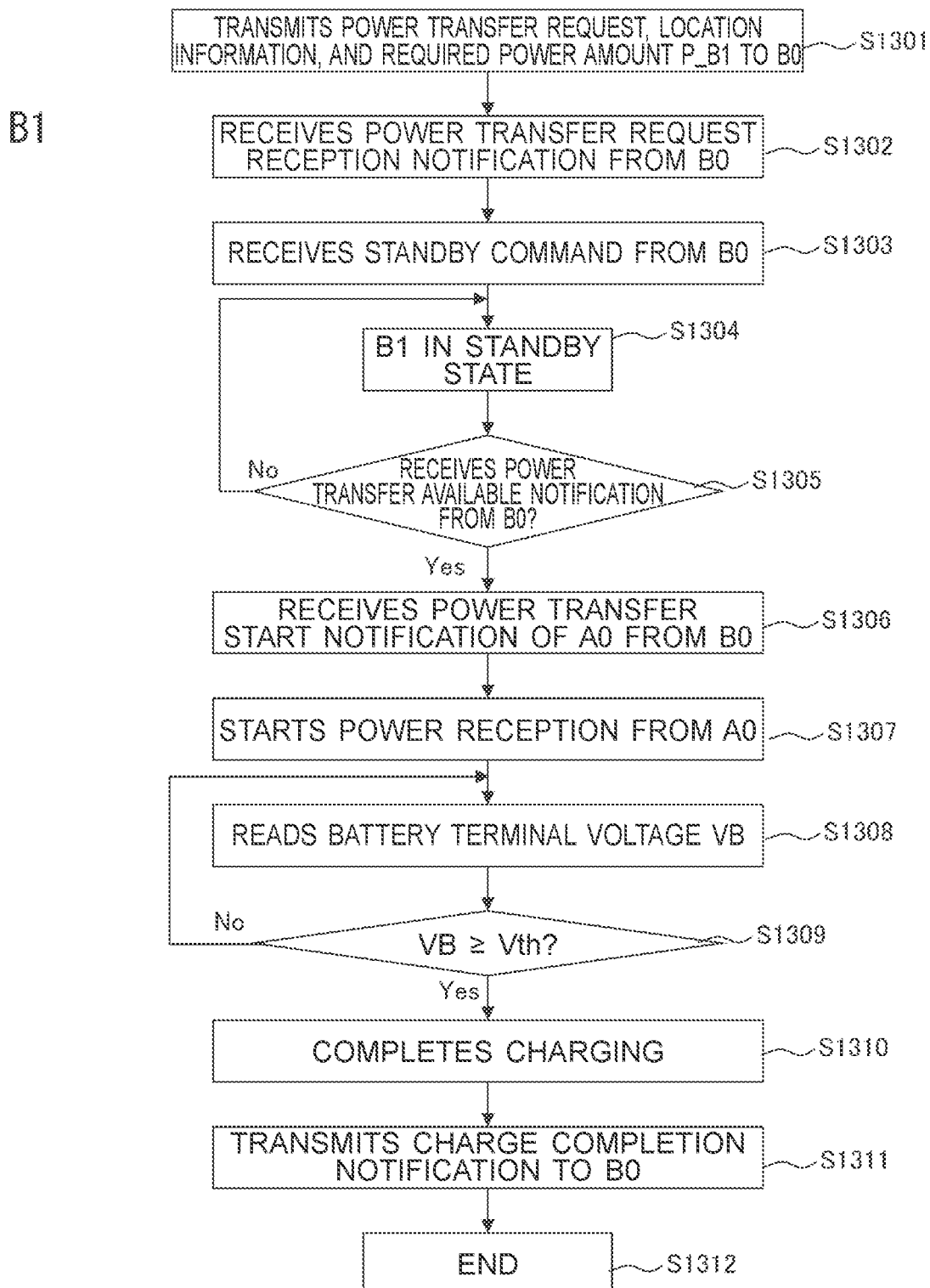
FIG. 13 illustrates a flowchart of processing in a subordinate portable device B1 of a group B requesting power transfer.
Figure 14:
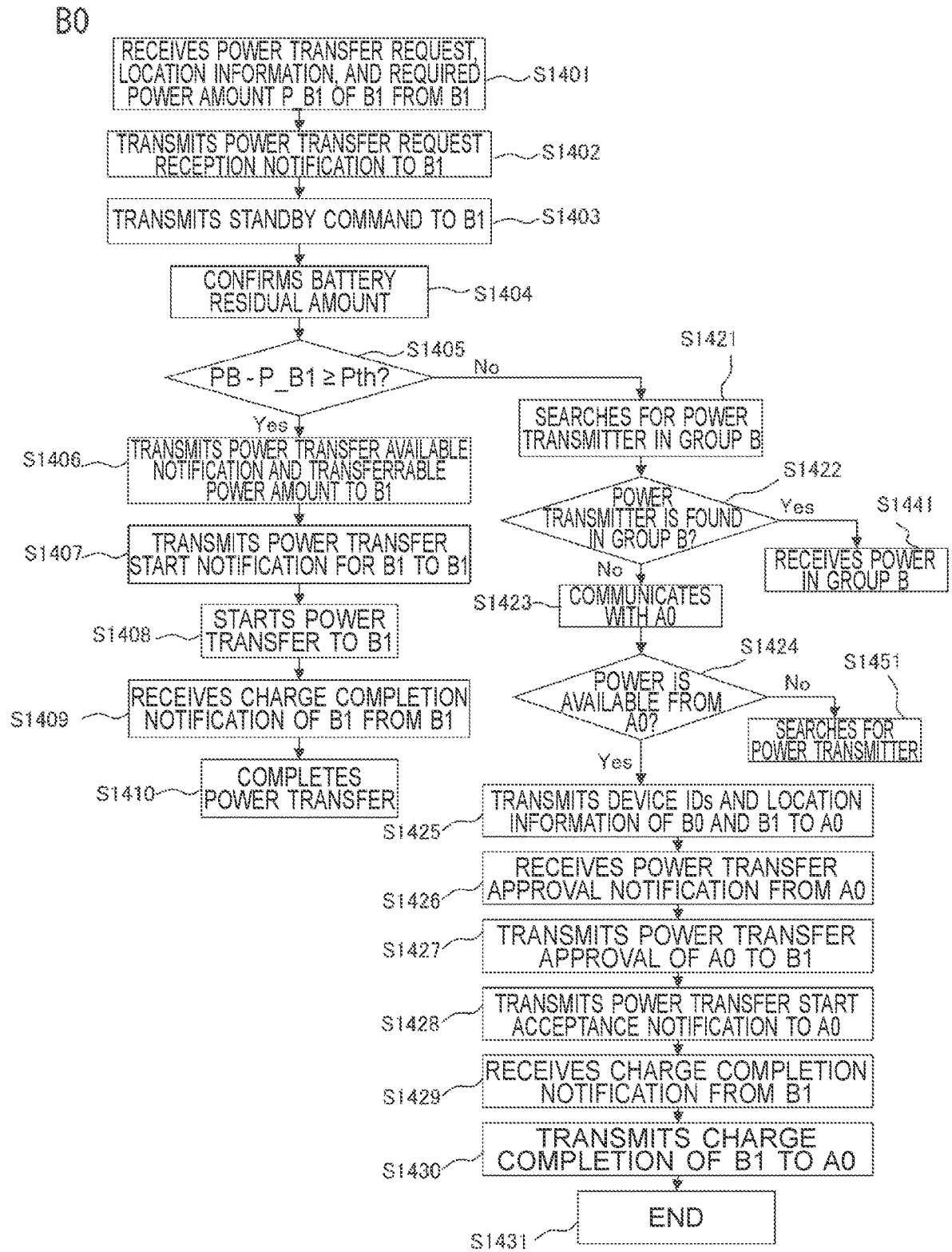
FIG. 14 illustrates a flowchart of processing in a main portable device B0 of a group B requesting power transfer.
Figure 15:
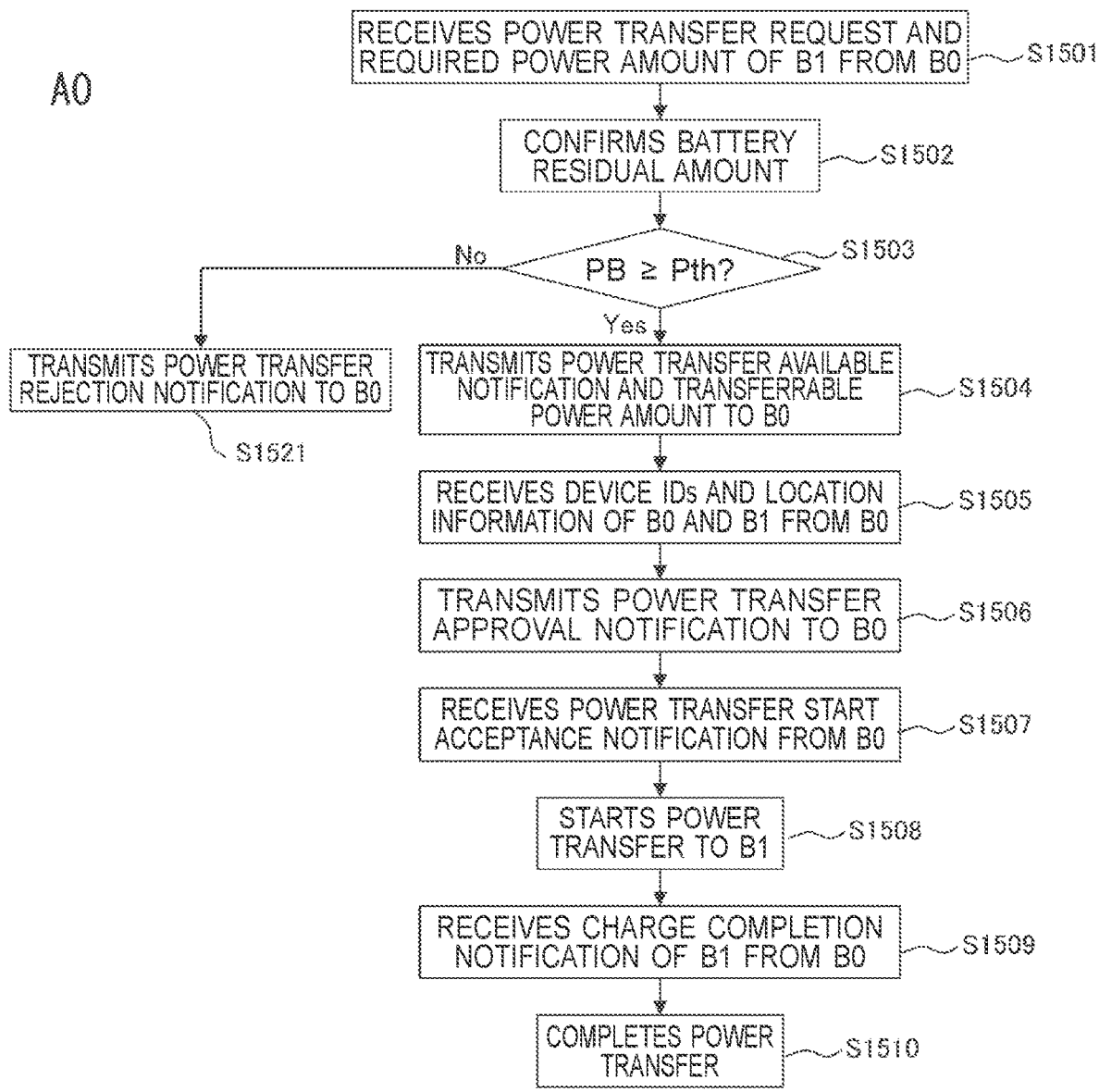
FIG. 15 illustrates a flowchart of processing in a main portable device A0 of a group A receiving a power transfer request.
Figure 16:
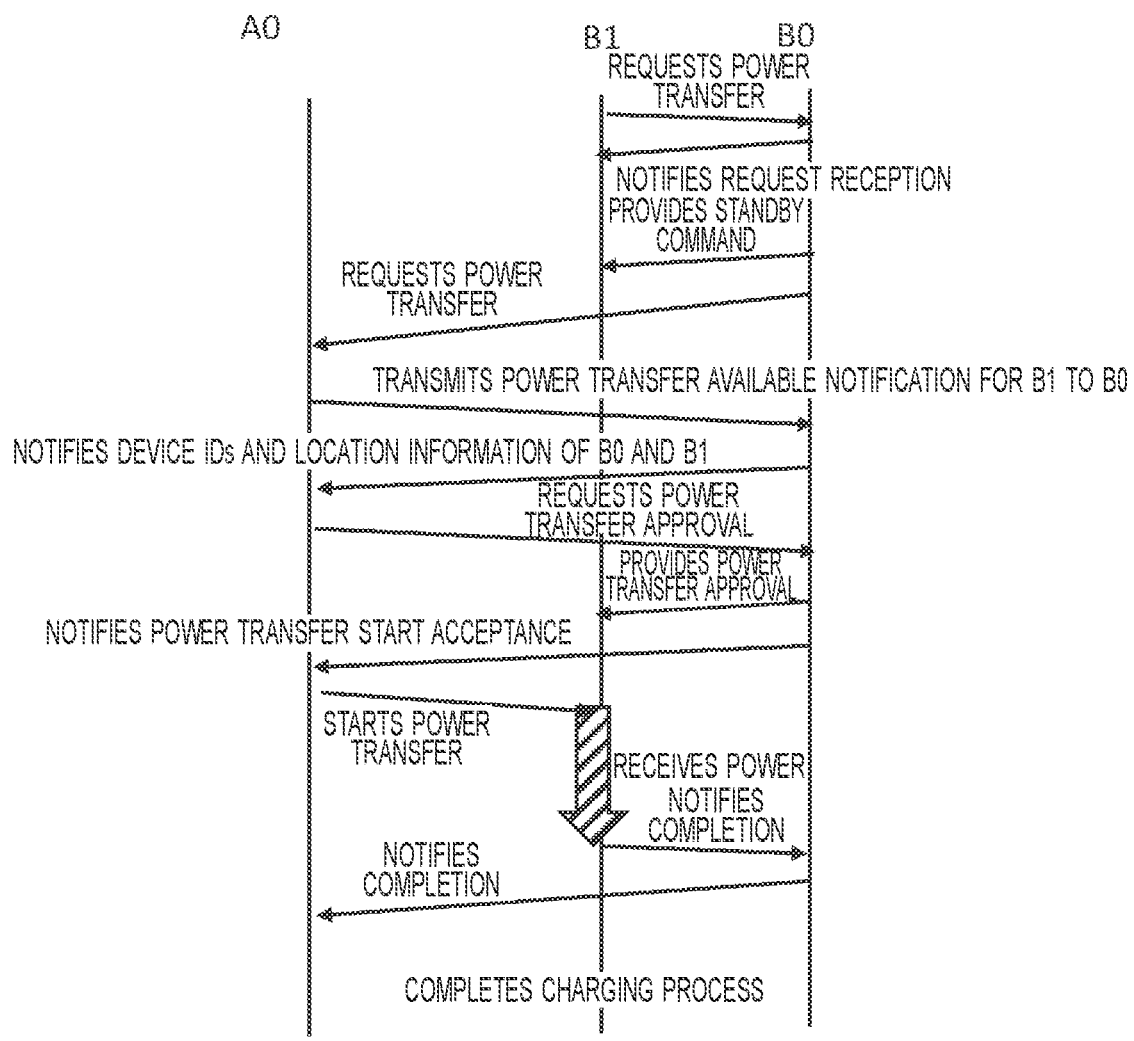
FIG. 16 illustrates a sequence of processing of power transfer request and response between groups A and B.

FIG. 13 illustrates a flowchart of processing in the subordinate portable device B1 of the group B making a power transfer request. FIG. 14 illustrates a flowchart of processing in the main portable device B0 of the group B making the power transfer request. FIG. 15 illustrates a flowchart of processing in the main portable device A0 of the group A receiving the power transfer request. FIG. 16 illustrates a sequence of the processing of power transfer request and response between the groups A, B.

Firstly, B1 transmits a power transfer request to B0 by inter-device communication (step S1301), and B0 receives the request (step S1401). Since steps S1402 to S1421 are the same as those of the first embodiment, the explanation thereof is omitted.

Since B0 and B2 do not have sufficient power to be transmitted to B1 (step S1422/No), the wireless power transmitter search section 104d of B0 searches for a wireless power transmitter in the outside of the group B based on the information in the device group information management section 104f. At this time, for example, the search for a wireless power transmitter is performed by wireless communication 10ab by causing the communication control section 104a to activate an ad hoc mode of Wi-Fi (registered trademark) of the third communication unit 103.

When A0 that performs control within the group A is found by this search (step S1422/Yes), the device location information acquisition section 104e of B0 and the device location information acquisition section 104e of A0 exchange information in the respective device group information management sections 104f, and B0 transmits, to A0, the power transfer request and information of a required amount of power of B1 (step S1423, step S1501).

The power control section 104b of A0 calculates an amount of power that can be transmitted, and the device group information management section 104f determines whether power transfer can be performed based on the location information acquired by the device location information acquisition section 104e (step S1502, step S1503).

When determining that the power transfer can be performed (step S1424/Yes), A0 transmits, to B0, a power transfer available notification and information of a transferrable amount of power, and B0 receives them (step S1504).

B0 transmits, to A0, the device IDs and location information of B0 and B1 (step S1425, step 1505) so that A0 can recognize the relative positional relationship between them.

The device ID can be used, for example, as billing information. The device ID and location information of each device may be obtained from a base station (not illustrated) of a wireless communication network of portable devices. Based on the information above, A0 transmits a power transfer approval request notification to B0 (step S1506), and B0 receives the notification (step S1426).

B0 transmits, to B1, a power transfer approval notification received from A0 (step S1427), and B1 receives the notification (step 1306).

B0 transmits a power transfer start acceptance notification to A0 (step S1428), and A0 receives the notification (step S1507). Upon receiving the power transfer start acceptance notification, A0 starts transferring power to B1 (step S1307, step S1508).

B1 reads a battery terminal voltage VB and keeps receiving power until VB exceeds a voltage value required to operate B1 (charge determination threshold) Vth (step S1308, step S1309). When VB exceeds Vth (step S1309/Yes), B1 completes charging (step S1310) and transmits a charge completion notification to B0 (step S1311), and B0 receives the notification (step S1429). Upon receiving the charge completion notification from B1, B0 transmits a notification that B1 completes charging to A0 (step S1430), and A0 receives the notification (step S1509) and terminates the power transfer (step S1510).

In the wireless power transmitter search processing performed by B0, B0 accesses A0 that performs control within the group A (step S1423), and A0 determines whether power transfer can be performed based on the information of the transferrable amount of power of A0 (step S1503). Meanwhile, a determination method is not limited thereto, and A0 may make determination above based on the total transferrable amount of power that can be transmitted from A1 and A2 which are portable devices capable of transferring power other than A0 in the group A.

In the processing above, at the stage when B1 receives the amount of power that can be transmitted from A0, B1 transmits a completion notification to the transmission source. In view of the power condition of the transmission source, A0 may stop transferring power to B1 at the time when power transfer of the transferrable amount of power calculated by A0 as the transmission source is finished.

Figures 17, 18A:
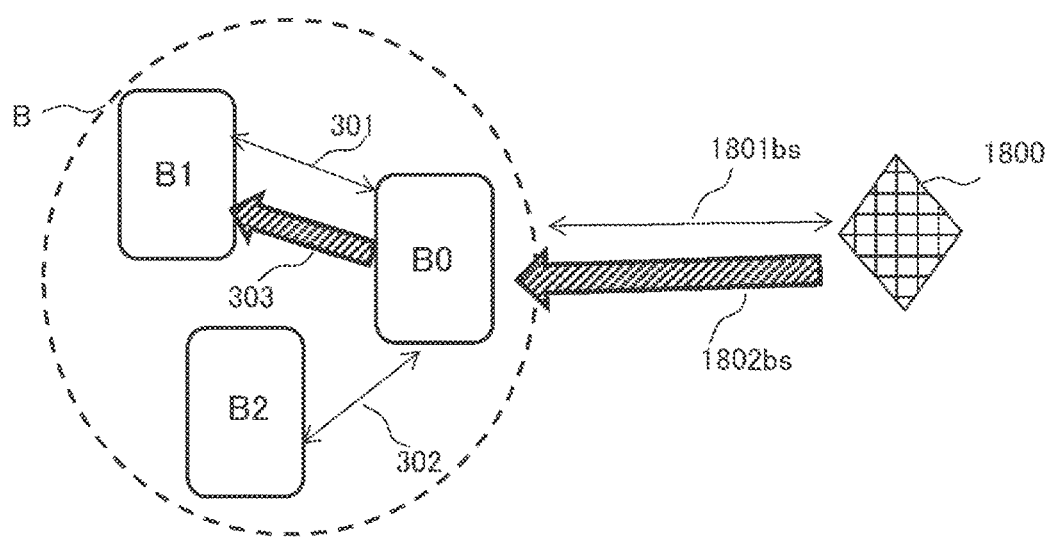
FIG. 17 illustrates a flow of power in each case of inter-group wireless power transfer.
FIG. 18A illustrates a power transfer mode in a third embodiment.

FIG. 17 illustrates a flow of power in each case of inter-group wireless power transfer. The case described with reference to FIGS. 14 to 16 corresponds to Case 2-1 in FIG. 17.

Case 1, Case 3, and Case 3-1 are cases where B0 makes a power transfer request while Case 2, Case 2-1, Case 4, Case 4-1, Case 4-2 and Case 4-3 are cases where B1 makes a power transfer request.

Furthermore, a portable device to be supplied with power is A0 in Case 1, Case 2, and Case 2-1 while it is A1 in other cases. When a communication network has a star structure, A1 and B1 always need to go through A0 and B0 to communicate with the outside of the group. On the other hand, the flow of power does not necessarily pass through A0 and B0 that perform control within the groups. Since the power transfer efficiency decreases as the number of portable devices interposed therebetween increases, direct power transfer, such as A1=B1 in Case 4-1, is the most efficient power transfer when comparing Case 4, Case 4-1, Case 4-2, and Case 4-3.

Furthermore, in the case where the wireless power transmitter search section 104d of the controller 104 of B0 searches the outside of the group to find a wireless power transmitter based on the information in the device group information management section 104f, the wireless power transmitter to be found may be an exclusive wireless power transmitter 1800 for exclusive use of wireless transmission which exists outside the group B as illustrated in FIG. 18A. In this case, it may be configured that B0 that performs control within the group B may communicate with the exclusive wireless power transmitter 1800 for exclusive use of wireless transmission by the communication 1801bs, receive the power transfer 1802bs, and transfer the power to the subordinate portable device A1 in the group A through A0.

Figure 18B:
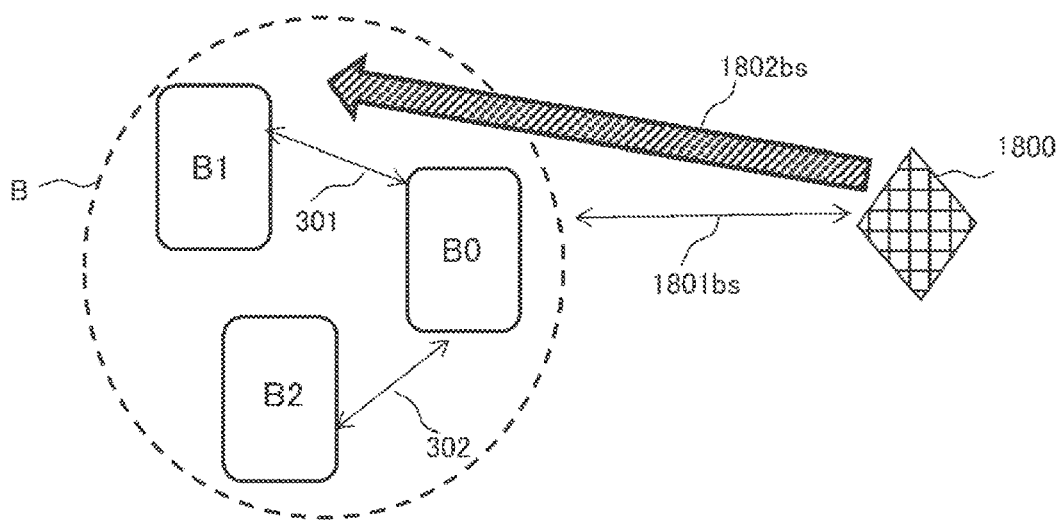
FIG. 18B illustrates a power transfer mode in the third embodiment.

Furthermore, as illustrated in FIG. 18B, it may be configured that B0 transmit the location information and information of a required power amount of B1 to the exclusive wireless power transmitter 1800 by the communication 1801bs so that B1 receives the information relating to power transfer to be performed by the exclusive wireless power transmitter 1800 through A0. As a result, the exclusive wireless power transmitter 1800 can directly transmit power to B1.

Figure 19:
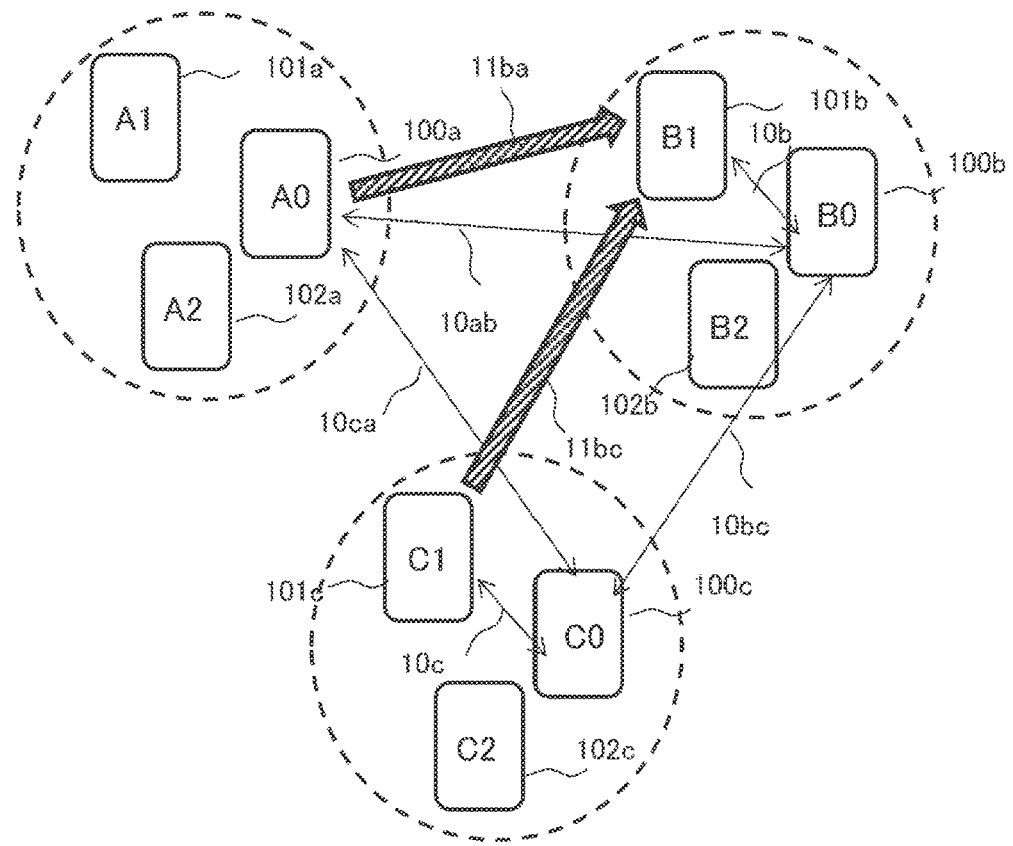
FIG. 19 illustrates a power transfer mode in the third embodiment.

Still further, when the power control section 104b, the device location information acquisition section 104e, and the device group information management section 104f of the controller 104 of B0 determine that the required power amount of B1 cannot be fully satisfied by power transfer from the group A (for example, 20% or less of the required power amount), B0 searches for a wireless power transmitter in a group other than the group A. For example, as illustrated in FIG. 19, B0 may access a portable device C0 that performs control within a group C so that the portable device C1 belonging to the group C transfers power to B1. The search for a wireless power transmitter may be performed via a base station (not illustrated) of a wireless communication network of portable devices.

As described above, according to the third embodiment, a portable device can be supplied with power not only from a wireless power transmitter for exclusive use of wireless transmission, but also from other portable devices. As a result, the load of the exclusive wireless power transmitter is distributed to the portable device capable of transferring power, thereby making it possible to reduce the load of the exclusive wireless power transmitter.

Fourth Embodiment

Figure 20:
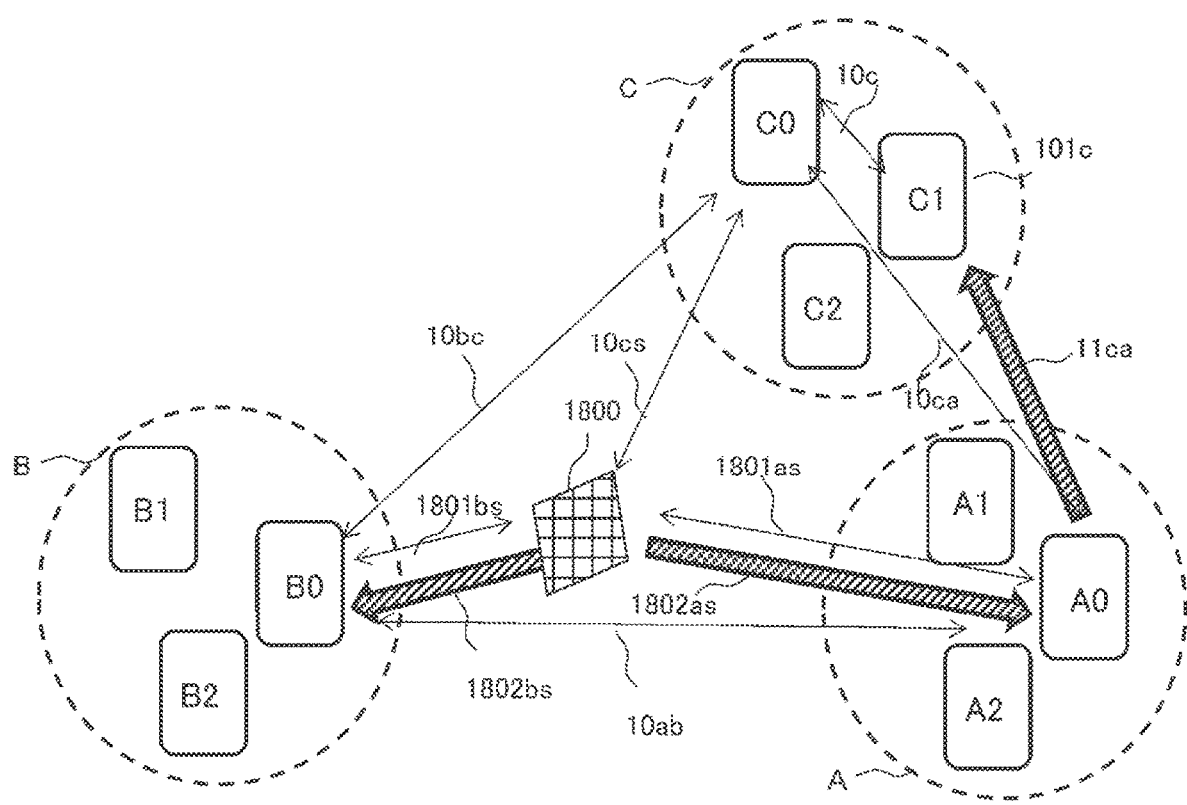
FIG. 20 illustrates an outline of a power transfer relationship between each group and a wireless power transmitter in a fourth embodiment.
Figure 21:
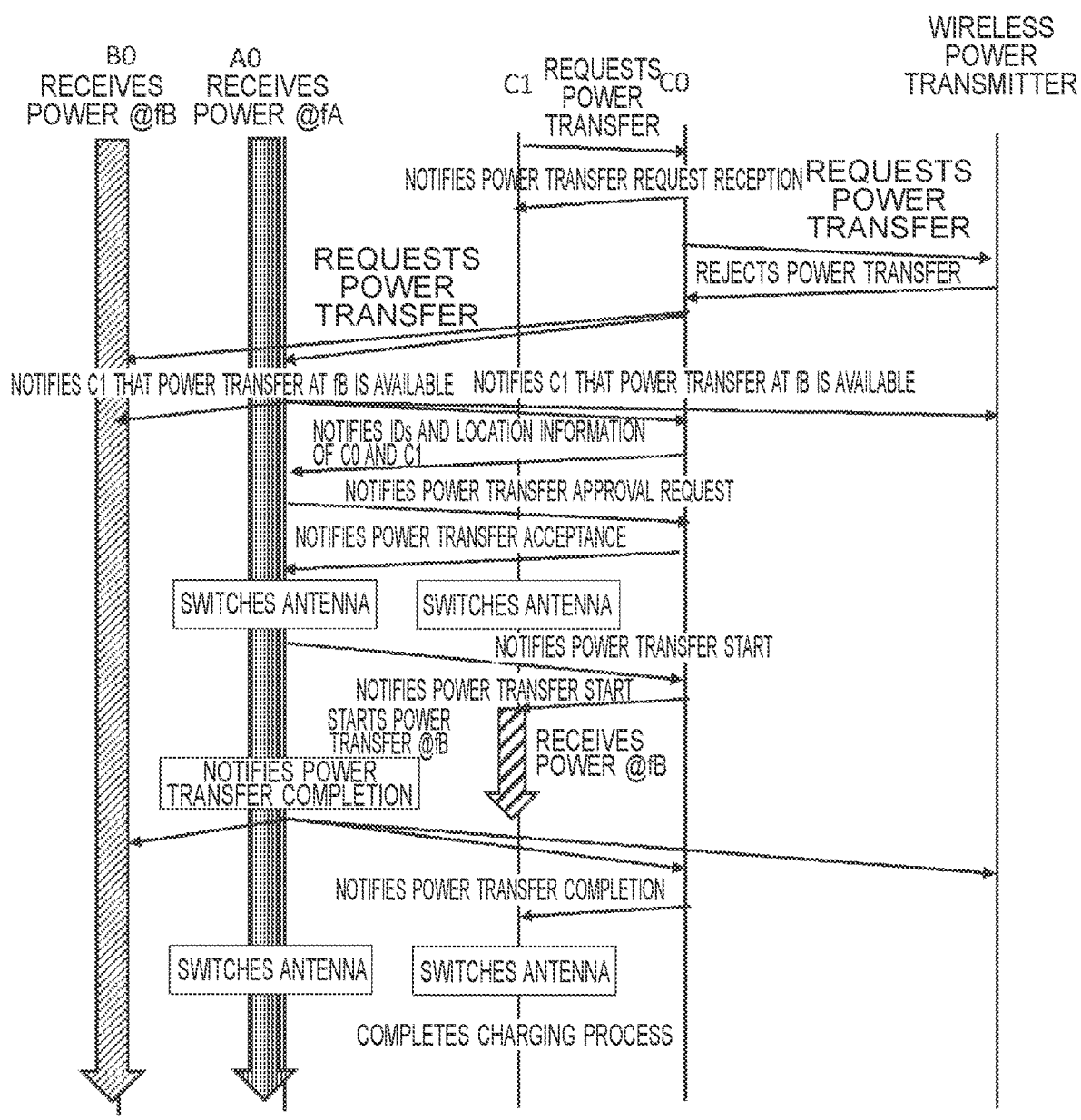
FIG. 21 illustrates a sequence of power transfer in the fourth embodiment.

A fourth embodiment is configured to transfer power between a plurality of groups while the groups are receiving power from a wireless power transmitter for exclusive use of wireless transmission. FIG. 20 illustrates an outline of a power transfer relationship between each group and a wireless power transmitter in the fourth embodiment. FIG. 21 illustrates a sequence of power transfer in the fourth embodiment.

FIG. 20 illustrates the groups A, B, C of the portable devices and the exclusive wireless power transmitter 1800 for exclusive use of wireless transmission. The groups A, C are positioned opposite to the group B across the exclusive wireless power transmitter 1800.

It is assumed that the exclusive wireless power transmitter 1800 transfers power to A0 of the group A at the frequency of fA while transferring power to the main portable device B0 of the group B at the frequency of fB. In this state, as illustrated in FIG. 21, C1 transmits a power transfer request to C0 by using inter-device communication 10c.

Upon receiving the power transfer request from C1, C0 transmits, to C1, a power transfer request reception notification and then a standby command by using the inter-device communication 10c. The wireless power transmitter search section 104d of C0 searches the outside of its group to find a wireless power transmitter based on the information in the device group information management section 104f. At this time, for example, the search for a wireless power transmitter is performed by causing the communication control section 104a to activate an ad hoc mode of Wi-Fi (registered trademark) of the third communication unit 103 to find the exclusive wireless power transmitter 1800 existing nearby.

C0 and the exclusive wireless power transmitter 1800 mutually exchange information stored in the device group information management section via wireless communication 10cs.

C0 makes a power transfer request to the exclusive wireless power transmitter 1800. However, since the exclusive wireless power transmitter 1800 has already been transferring power to A0 and B0 at the frequency of fA and fB, respectively, it returns rejection of power transfer to C0.

Next, the wireless power transmitter search section 104d of the controller 104 of C0 finds A0 and B0 based on the information in the device group information management section 104f. Between C0 and A0 and between C0 and B0, the device location information acquisition section 104e included in each of A0, B0, and C0 exchanges the information in the device group information management section 104f included in each of A0, B0, and C0 by using the wireless communication 10ca and 10b. At the same time, C0 transmits a power transfer request and information of a required amount of power to each of A0 and B0.

Each of A0 and B0 calculates an amount of power that can be transmitted by means of the power control section 104b, the device location information acquisition section 104e, and the device group information management section 104f of each control device 104, and determines the frequency that can be used so as to determine whether power transfer can be performed. When determining that power transfer can be performed, each of A0 and B0 transmits a power transfer available notification, information of a transferrable power amount, and power transfer frequency to each portable device that performs control within each of other groups and the exclusive wireless power transmitter 1800.

The groups A, C are located on the opposite side of the group B with the exclusive wireless power transmitter 1800 interposed therebetween. Accordingly, when the frequency of fB used in the power transfer 1802bs from the exclusive wireless power transmitter 1800 to B0 is used for the power transfer 1802ca from A0 to C1, the power transfer 1802ca does not interfere with the power transfer 1802bs nor the power transfer 1802as (frequency fA) from the exclusive wireless power transmitter 1800 to A0. As a result, it is possible to increase the efficiency of frequency use in the area where the groups A, B, C of portable devices and the exclusive wireless power transmitter 1800 for exclusive use of wireless transmission exist.

In order to simplify the explanation, FIG. 21 illustrates only the data transmitted from A0. Upon receiving the above, C0 transmits, to A0, the device IDs and location information of C0 and C1, thereby making it possible to recognize the relative positional relationship between them and allowing the device IDs to be used as billing information. The device IDs and device location information may be obtained from a base station (not illustrated) of a wireless communication network of portable devices. Based on the information above, A0 transmits a power transfer approval request notification to C0, and C0 transmits a power transfer approval notification of A0 to C1 while transmitting a power transfer start acceptance notification to A0. Upon receiving the power transfer start acceptance notification, A0 switches the antenna for the frequency band of fB to the power transfer control circuit 113 side by the first antenna switch 101b or the second antenna switch 102b. Furthermore, C1 switches the antenna for the frequency band of fB to the power reception control circuit 112 side by the first antenna switch 101b or the second antenna switch 102b. Thereafter, A0 starts transferring power to C1.

At the stage when A0, which is the transmission source, finishes transferring power of the calculated transferrable amount, A0 stops transferring power to C1 and transmits a power transfer completion notification to C0. Each of A0 and C1 switches the antenna switch for the frequency band of fB to the first wireless IC 101c side or the second wireless IC 102c side.

In the above, the case where the frequency interference does not occur during the inter-group power transfer has been described. On the other hand, in the case where the frequency interference occurs during the inter-group power transfer, control which is different from the above-described control may be performed. For example, the power control section 104b, the device location information acquisition section 104e, and the device group information management section 104f of the A0 calculate an amount of power that can be transmitted, determine the frequency that can be used, and transmit a power transfer available notification, and information of the transferable power amount and power transfer frequency to a portable device that performs control within each of other groups and the exclusive wireless power transmitter 1800. At this point, the residual amount of power transfer from the exclusive wireless power transmitter 1800 to B0 is compared with the amount of power transfer from A0 to C1. As a result of the comparison above, when the residual amount of power transfer from the exclusive wireless power transmitter 1800 to B0 is greater than the amount of power transfer from A0 to C1 (for example, 30% or more), control may be performed so as to cause B0 to pass the frequency of fB to the power transfer to C1. According to the control above, it is possible to secure the frequency for performing wireless power transfer to a portable device or a subordinate portable device which requires high necessity of charging.

According to the fourth embodiment, a portable device can be supplied with power not only from a wireless power transmitter for exclusive use of wireless transmission, but also from other portable devices. As a result, the load of the exclusive wireless power transmitter 1800 is distributed to the portable device capable of transferring power, thereby making it possible to reduce the load of the exclusive wireless power transmitter 1800. Furthermore, by using the positional relationship between the groups, it is possible to increase the efficiency of frequency use in the area where a plurality of groups exists.

The present invention should not be interpreted as being limited to the embodiments described above. Modifications of the specific configurations without departing from the idea and concept of the present invention are included in the technical scope of the present invention.

For example, in the embodiments above, only three portable devices are illustrated per group in order to simplify the explanation. Meanwhile, the number of portable devices per group is not limited to three. Generally, a group X is formed by a portable device X0 that performs control within the group X and a portable device Xi (i=1, 2, . . . ) that operates in accordance with the portable device X0, and a network in the group X has a star structure whose center is X0. Meanwhile, the group X may be formed by the portable device X0 alone. The portable device X0 that performs control within the group X may be determined by the user by using, for example, a pairing function of Bluetooth (registered trademark), or may be determined based on information such as a battery capacity, location information, residual power amount, power reception function, power transfer function, power transfer efficiency, and power reception efficiency, in addition to IDs of devices, by communicating between the portable devices existing nearby. For example, the portable device X0 that performs control within the group X may be determined to be a portable device having the power transfer function, power reception function, wireless means of various types of communication standard, and large battery capacity.

REFERENCE SIGNS LIST

1: wireless power transfer system
31: inter-device communication
32: inter-device communication
41: electromagnetic waves
42: electromagnetic waves
51: wireless power transmitter
52: 5G base station
61: electromagnetic waves
62: electromagnetic waves
A0: portable device
A1: subordinate portable device
A2: portable device

The invention claimed is:
1. A portable device-terminal comprising:
a communication transceiver configured to receive, from at least one subordinate portable terminal that operates in accordance with control performed by the portable terminal, a power transfer request signal with respect to the subordinate portable terminal;
a power transfer control circuit configured to transfer power to the subordinate portable terminal;
a battery; and
a controller configured to control an operation of the communication transceiver and an operation of the power transfer control circuit,
where the controller is further configured to:
when the communication transceiver receives the power transfer request signal, detect a battery residual amount charged in the battery, and
perform control for causing the power transfer control circuit and the communication transceiver to output electromagnetic waves for wireless power transfer in accordance with a detection result of the battery residual amount,
wherein the power transfer request signal includes a required amount of power requested by the subordinate portable device, and
wherein the controller is further configured to:
determine whether power transfer to the subordinate portable terminal can be performed based on a comparison result obtained by comparing the battery residual amount and the required amount of power with a power transfer lower allowable limit value used for determining whether the power transfer to the subordinate portable terminal can be performed,
when determining that the power transfer to the subordinate portable terminal can be performed, output a power transfer instruction signal to the power transfer control circuit,
when determining that power transfer that satisfies the required amount of power cannot be performed based on the comparison result obtained by comparing the battery residual amount and the required amount of power with the power transfer lower allowable limit value, calculate a transferrable amount of power which has a value smaller than the required amount of power and is allowable to be transferred to the subordinate portable terminal, and
control the power transfer so as to transfer the transferrable amount of power to the subordinate portable terminal.
2. The portable terminal device according to claim 1, further comprising:
an external communication transceiver configured to receive wireless power transfer waves; and
a power reception control circuit configured to receive power with electromagnetic waves received via the external communication transceiver,
wherein the controller is further configured to:
when determining that the power transfer that satisfies the required amount of power cannot be performed, search for a wireless power transmitter that performs wireless power transfer via the external communication transceiver,
receive power with electromagnetic waves from the wireless power transmitter as found as a result of search for the wireless power transmitter, and
perform control for causing the power reception control circuit to charge the battery by using the power as received and causing the power transfer control circuit to transmit the power in the battery to the subordinate portable terminal.
3. The portable terminal according to claim 2, further comprising:
a wireless communication transceiver configured to communicate with an exclusive wireless power transmitter,
wherein the external communication transceiver includes a mobile communication system communication transceiver,
the wireless power transmitter includes the exclusive wireless power transmitter connected to the portable terminal via the wireless communication transceiver and a mobile wireless base station connected to the portable terminal via the mobile communication system communication transceiver, and
the controller is further configured to, when finding both the exclusive wireless power transmitter and the mobile wireless base station as a result of the search for the wireless power transmitter, perform control to transmit a power transfer request notification to the exclusive wireless power transmitter.
4. The portable terminal according to claim 2,
wherein the external communication transceiver is a mobile communication system communication transceiver, wherein the wireless power transmitter is a mobile wireless base station connected to the portable terminal device via the mobile communication system communication transceiver, and wherein the controller is further configured to, when detecting that the battery residual amount is equal to or less than a power reception start threshold used for determining start of power reception, transmit a power transfer request notification to the mobile wireless base station, and when detecting that the battery residual amount is equal to or more than a power reception stop threshold used for determining stop of the power reception, transmit a charge completion notification to the mobile wireless base station.

5. The portable terminal according to claim 4, wherein the power reception stop threshold is a value smaller than a total amount of a charge capacity of the battery and greater than the power reception start threshold.

6. A wireless power transfer method by a portable terminal, comprising the steps of:
receiving, by the portable terminal, from at least one subordinate portable terminal that operates in accordance with control by the portable terminal, a power transfer request signal with respect to the subordinate portable device terminal, the power transfer request signal including a required amount of power requested by the subordinate portable device;

detecting, by the portable terminal, a battery residual amount charged in a battery provided in the portable device terminal;

outputting, by the portable terminal, electromagnetic waves for transferring power to the subordinate portable terminal in accordance with a detection result of the battery residual amount;

determining whether power transfer to the subordinate portable terminal can be performed based on a comparison result obtained by comparing the battery residual amount and the required amount of power with a power transfer lower allowable limit value used for determining whether the power transfer to the subordinate portable terminal can be performed;

when determining that the power transfer to the subordinate portable terminal can be performed, outputting a power transfer instruction signal to the power transfer control circuit;

when determining that power transfer that satisfies the required amount of power cannot be performed based on the comparison result obtained by comparing the battery residual amount and the required amount of power with the power transfer lower allowable limit value, calculating a transferrable amount of power which has a value smaller than the required amount of power and is allowable to be transferred to the subordinate portable terminal; and controlling the power transfer so as to transfer the transferrable amount of power to the subordinate portable terminal.

7. The wireless power transfer method according to claim 6, further comprising:
receiving, by an external communication transceiver, wireless power transfer waves;

receiving, by a power reception control circuit, power with electromagnetic waves received via the external communication transceiver;

when determining that the power transfer that satisfies the required amount of power cannot be performed, searching for a wireless power transmitter that performs wireless power transfer via the external communication transceiver;

receiving power with electromagnetic waves from the wireless power transmitter as found as a result of search for the wireless power transmitter; and performing control for causing the power reception control circuit to charge the battery by using the power as received and causing the power transfer control circuit to transmit the power in the battery to the subordinate portable terminal.

8. The wireless power transfer method according to claim 7, further comprising:
communicating, by a wireless communication transceiver, with an exclusive wireless power transmitter,
wherein the external communication transceiver includes a mobile communication system communication transceiver, wherein the wireless power transmitter includes the exclusive wireless power transmitter connected to the portable terminal via the wireless communication transceiver and a mobile wireless base station connected to the portable terminal via the mobile communication system communication transceiver, and wherein the method further comprises when finding both the exclusive wireless power transmitter and the mobile wireless base station as a result of the search for the wireless power transmitter, performing control to transmit a power transfer request notification to the exclusive wireless power transmitter.

9. The wireless power transfer method according to claim 7,
wherein the external communication transceiver is a mobile communication system communication transceiver, wherein the wireless power transmitter is a mobile wireless base station connected to the portable terminal via the mobile communication system communication transceiver, wherein the method further comprises:
when detecting that the battery residual amount is equal to or less than a power reception start threshold used for determining start of power reception, transmitting a power transfer request notification to the mobile wireless base station; and when detecting that the battery residual amount is equal to or more than a power reception stop threshold used for determining stop of the power reception, transmitting a charge completion notification to the mobile wireless base station.

10. The wireless power transfer method according to claim 9,
wherein the power reception stop threshold is a value smaller than a total amount of a charge capacity of the battery and greater than the power reception start threshold.

* * * * *